US012666037B2

(12) United States Patent
Yan et al.

(10) Patent No.: US 12,666,037 B2
(45) Date of Patent: Jun. 23, 2026

(54) DECODER SIDE MOTION INFORMATION DERIVATION

(71) Applicant: BEIJING DAJIA INTERNET INFORMATION TECHNOLOGY CO., LTD., Beijing (CN)

(72) Inventors: Ning Yan, San Diego, CA (US); Yi-Wen Chen, San Diego, CA (US); Xiaoyu Xiu, San Diego, CA (US); Wei Chen, San Diego, CA (US); Che-Wei Kuo, San Diego, CA (US); Hong-Jheng Jhu, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/669,666

(22) Filed: May 21, 2024

(65) Prior Publication Data

US 2024/0305786 A1      Sep. 12, 2024

Related U.S. Application Data

(63) Continuation of application No. PCT/US2022/050659, filed on Nov. 22, 2022.

(Continued)

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/147* (2014.11); *H04N 19/176* (2014.11); *H04N 19/573* (2014.11)

(58) Field of Classification Search
CPC .. H04N 19/105; H04N 19/139; H04N 19/147; H04N 19/176; H04N 19/573
See application file for complete search history.

(56) References Cited

U.S. PATENT DOCUMENTS

| | | | |
|---|---|---|---|
| 2019/0289317 A1 | 9/2019 | Hsu | |
| 2020/0221117 A1* | 7/2020 | Liu | H04N 19/577 |
| 2020/0314445 A1* | 10/2020 | Park | H04N 19/52 |

FOREIGN PATENT DOCUMENTS

| | | |
|---|---|---|
| CN | 113424538 A | 9/2021 |
| KR | 1020190110065 A | 9/2019 |

(Continued)

OTHER PUBLICATIONS

International Search Report and Written Opinion in related PCT Application No. PCT /US2022/050659 dated Mar. 17, 2023 (10 pages).

(Continued)

*Primary Examiner* — Jeremiah C Hallenbeck-Huber
(74) *Attorney, Agent, or Firm* — Bayes PLLC

(57) ABSTRACT

Implementations of the disclosure provide a video processing method for motion information derivation. The video processing method may include determining, by a video decoder, that one or more motion related parameters for a video block in a video frame of a video are not signaled in a bitstream. The video processing method may further include determining, by the video decoder, the one or more motion related parameters for the video block by applying a coding matching technique.

19 Claims, 16 Drawing Sheets

900

Determine that one or more motion related parameters for a video block in a video frame of a video are not signaled in a bit stream from a video encoder      902

Determine the one or more motion related parameters for the video block by applying a coding matching technique, where the coding matching technique is a template matching technique or a bilateral matching technique      904

Related U.S. Application Data

(60) Provisional application No. 63/281,821, filed on Nov. 22, 2021.

(51) Int. Cl.
| | | |
|---|---|---|
| H04N 19/147 | (2014.01) | |
| H04N 19/176 | (2014.01) | |
| H04N 19/573 | (2014.01) | |

(56) References Cited

FOREIGN PATENT DOCUMENTS

| KR | 1020190142749 A | 12/2019 |
|---|---|---|
| KR | 1020200015499 A | 2/2020 |

OTHER PUBLICATIONS

Benjamin Bross et al., Versatile Video Coding Editorial Refinements on Draft 10, Joint Video Experts Team (JVET) of ITU-T SG 16 WP 3 and ISO/IEC JTC 1/SC 29/WG 11, [Document: JVETT2001-v2, (version 2)], 20th Meeting: by teleconference, pp. 1-511, Nov. 24, 2020.

Extended European Search Report in related European Application No. 22896592.7 dated Sep. 15, 2025 (13 pages).

Kamp S et al: "Multihypothesis prediction using decoder side-motion vector derivation in inter-frame video coding", Visual Communications and Image Processing; Jan. 20, 2009-Jan. 22, 2009; San Jose, Jan. 20, 2009 (Jan. 20, 2009), XP030081712.

Esenlik (Huawei) S et al: "Description of Core Experiment 9 (CE9): Decoder Side Motion Vector Derivation", 122. MPEG Meeting; Apr. 16, 2018-Apr. 20, 2018; San Diego; (Motion Picture Expert Group or ISO/IEC JTC1/SC29/WG11), No. m42832 Apr. 20, 2018 (Apr. 20, 2018), XP030262021. Retrieved from the Internet: URL:http://phenix.int-evry.fr/mpeg/doc_end_user/documents/ 122_San%20Diego/wg11/m42832-JVETJ1029-v1-JVET-J1029.zip JVET-J1029.doc [retrieved on Apr. 20, 2018].

Kim D et al: "AHG12: Bilateral matching SMVD mode", 24. JVET Meeting; Oct. 6, 2021-Oct. 15, 20211; Teleconference; (The Joint Video Exploration Team of ISO/IEC JTC1/SC29/WG11 and ITU-TSG.16), No. JVET-X0058; m57851 Oct. 6, 2021 (Oct. 6, 2021), XP030297899. Retrieved from the Internet: URL:https://jvet-experts.org/doc_end_user/documents/24_Teleconference/wg11/JVET-X0058-v2.zip JVET-X0058-v2.docx [retrieved on Oct. 6, 2021].

* cited by examiner

Decoder Side Derivation Process 610

Syntax Element Analysis 612

Motion Related Parameter Derivation 614

MVD Prediction 618

Reference Index Derivation 620

Encoder Side Coding Process 600

MVD Coding 602

Absolute Value Binarization 604

Bit Plane Splitting 606

Syntax Element Generation 608

$$29 = 1 \times 2^4 + 1 \times 2^3 + 1 \times 2^2 + 0 \times 2^1 + 1 \times 2^0$$

29=00000...00000, 0001, 1101

MSBs    d-MSBs    LSBs

900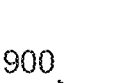

| Determine that one or more motion related parameters for a video block in a video frame of a video are not signaled in a bit stream from a video encoder | 902 |

| Determine the one or more motion related parameters for the video block by applying a coding matching technique, where the coding matching technique is a template matching technique or a bilateral matching technique | 904 |

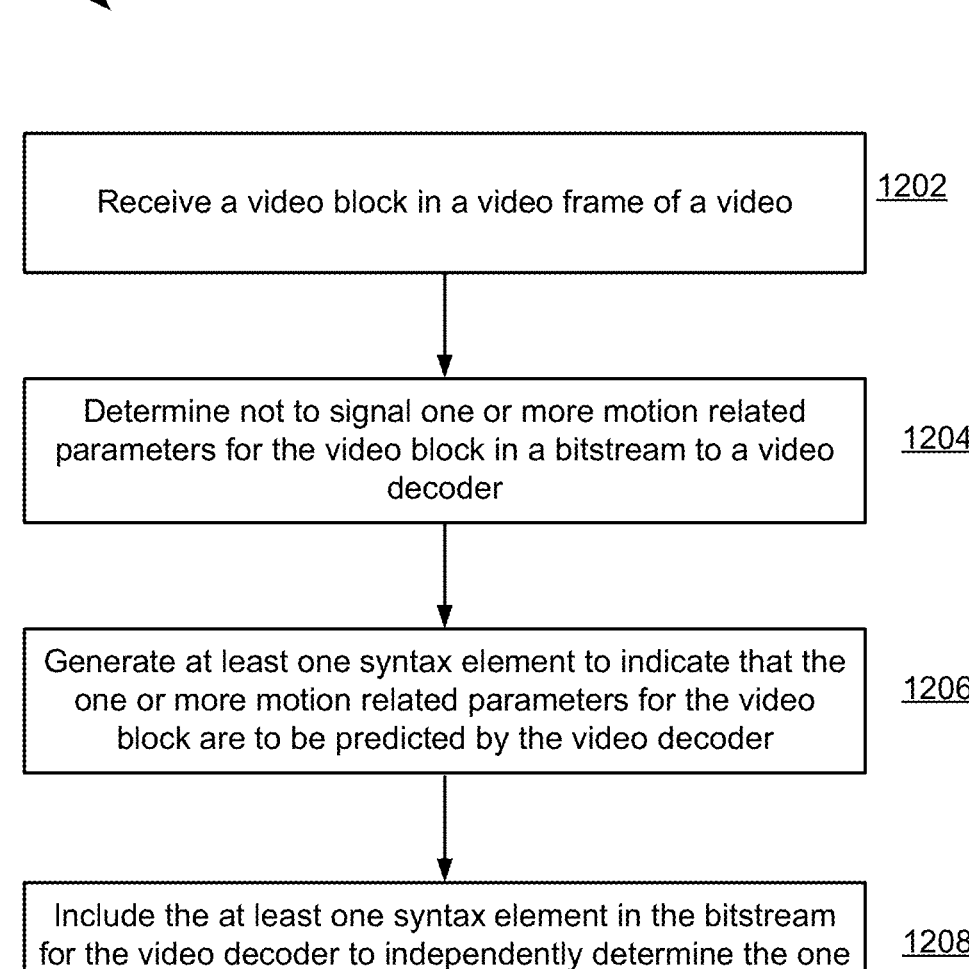

Receive a video block in a video frame of a video    1202

Determine not to signal one or more motion related parameters for the video block in a bitstream to a video decoder    1204

Generate at least one syntax element to indicate that the one or more motion related parameters for the video block are to be predicted by the video decoder    1206

Include the at least one syntax element in the bitstream for the video decoder to independently determine the one or more motion parameters    1208

FIG. 12

DECODER SIDE MOTION INFORMATION DERIVATION

CROSS-REFERENCE TO RELATED APPLICATIONS

This application is a continuation of PCT Application No. PCT/US2022/050659, filed Nov. 22, 2022, which is based upon and claims priority to U.S. Provisional Application No. 63/281,821, filed Nov. 22, 2021, the content thereof is incorporated herein by reference in its entirety.

TECHNICAL FIELD

This application is related to video coding and compression. More specifically, this application relates to video processing apparatuses and methods for motion information derivation on a video decoder side.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Implementations of the present disclosure provide a video processing method for motion information derivation. The video processing method may include determining, by a video decoder, that one or more motion related parameters for a video block in a video frame are not signaled in a bitstream. The video processing method may further include determining, by the video decoder, the one or more motion related parameters for the video block by applying a coding matching technique. The coding matching technique is a template matching technique or a bilateral matching technique.

Implementations of the present disclosure also provide a video decoder apparatus for motion information derivation. The video decoder apparatus may include a memory configured to store a bitstream and a processor coupled to the memory. The processor may be configured to determine that one or more motion related parameters for a video block in a video frame are not signaled in the bitstream. The processor may further be configured to determine the one or more motion related parameters for the video block by applying a coding matching technique. The coding matching technique is a template matching technique or a bilateral matching technique.

Implementations of the present disclosure also provide a non-transitory computer-readable storage medium having storing a bitstream to be decoded by a video processing method. The video processing method may include determining that one or more motion related parameters for a video block in a video frame are not signaled in the bitstream. The video processing method may further include determining the one or more motion related parameters for the video block by applying a coding matching technique. The coding matching technique is a template matching technique or a bilateral matching technique.

Implementations of the present disclosure also provide a video processing method for encoding motion information. The video processing method may include receiving, by a video encoder, a video block in a video frame. The video processing method may include determining, by the video encoder, not to signal one or more motion related parameters for the video block in a bitstream. The video processing method may include generating, by the video encoder, at least one syntax element to indicate that the one or more motion related parameters for the video block are to be predicted. The video processing method may further include including, by the video encoder, the at least one syntax element in the bitstream to independently determine the one or more motion related parameters.

Alternatively, the one or more motion related parameters include one or more motion vector differences (MVDs) for the video block.

Alternatively, generating the at least one syntax element includes: for each of the one or more MVDs, encoding the MVD using a binarization and splitting method; and generating a set of syntax elements based on the encoding of the MVD.

Alternatively, for each of the one or more MVDs, encoding the MVD using the binarization and splitting method includes: binarizing an absolute value of the MVD into a bit plane; dividing the bit plane into a set of most significant bins (MSBs), a set of derived most significant bins (d-MSBs), and a set of least significant bins (LSBs); and generating a reduced absolute value for the MVD using the set of MSBs and the set of LSBs.

Alternatively, for each of the one or more MVDs, generating the set of syntax elements based on the encoding of the MVD includes: generating a first syntax element for indicating whether MVD prediction is to be applied on the video decoder; generating a second syntax element for signaling the reduced absolute value of the MVD to the video decoder; generating a third syntax element for signaling a length of the set of d-MSBs to the video decoder; and generating a fourth syntax element for signaling a position where the set of d-MSBs starts in the bit plane to the video decoder.

Alternatively, the one or more motion related parameters include one or more reference indices for the video block.

Alternatively, generating the at least one syntax element includes: generating a syntax element for indicating whether reference index derivation is to be applied on the video decoder.

Alternatively, the video block is coded using a uni-prediction scheme or a bi-prediction scheme by the video encoder.

Implementations of the present disclosure also provide a video encoder apparatus for encoding motion information. The video encoder apparatus may include a memory configured to store a bitstream and a processor coupled to the memory. The processor may be configured to receive a video block in a video frame. The processor may be configured to determine not to signal one or more motion related parameters for the video block in a bitstream. The processor may be configured to generate at least one syntax element to indicate that the one or more motion related parameters for the video block are to be predicted. The processor may be configured to include the at least one syntax element in the bitstream to independently determine the one or more motion related parameters.

Implementations of the present disclosure also provide a non-transitory computer-readable storage medium having stored therein a bitstream and instructions which, when executed by a processor of a video encoder, cause the processor to perform a video processing method for encoding motion information. The video processing method may include receiving a video block in a video frame. The video processing method may include determining not to signal one or more motion related parameters for the video block in a bitstream. The video processing method may include generating, by the video encoder, at least one syntax element to indicate that the one or more motion related parameters for the video block are to be predicted. The video processing method may further include including the at least one syntax element in the bitstream to independently determine the one or more motion related parameters.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 9 is a flow chart of an exemplary method for motion information derivation in accordance with some implementations of the present disclosure.

FIG. 12 is a flow chart of an exemplary method for encoding motion information in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

Figure 1:
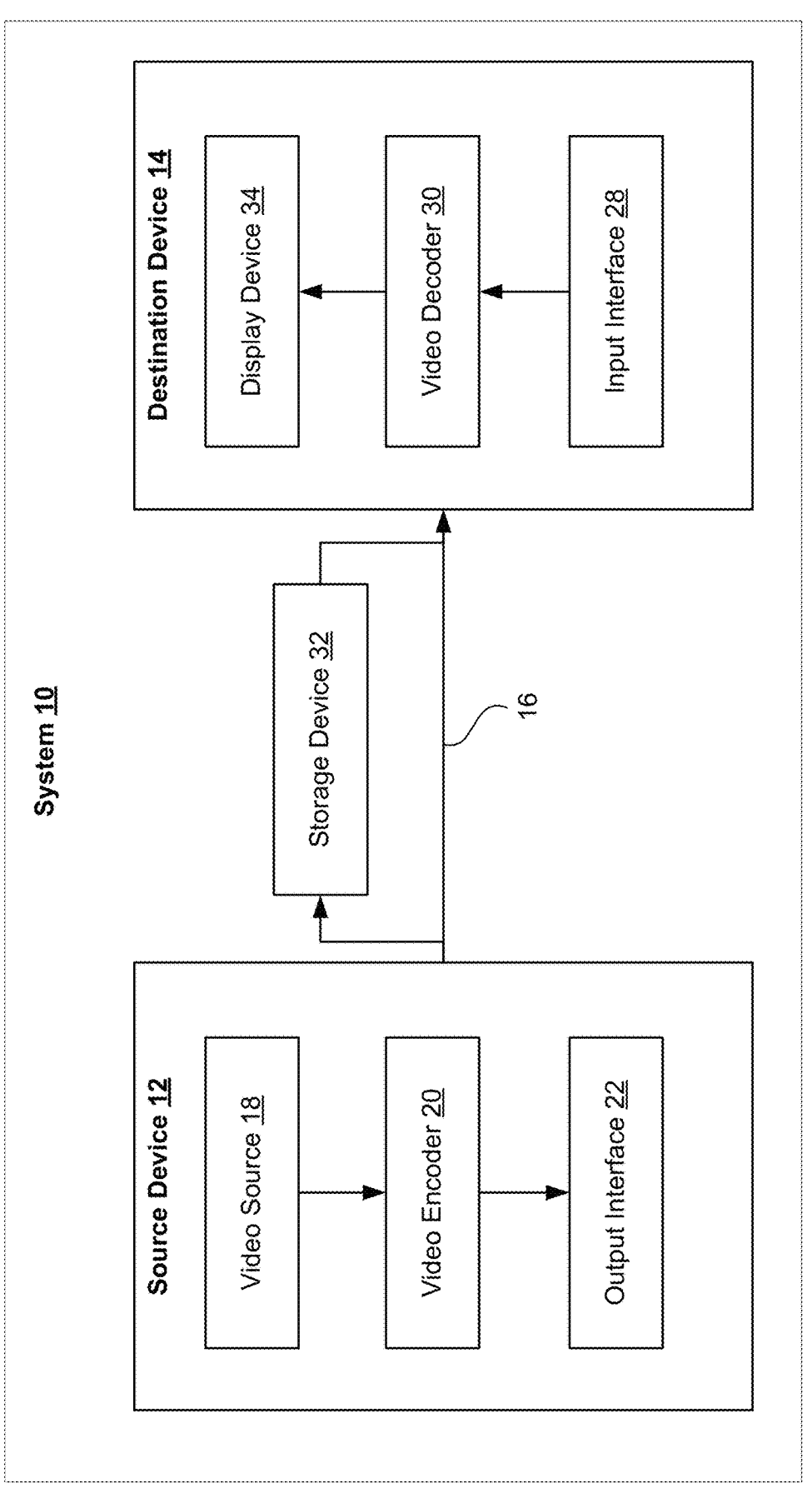
FIG. 1 is a block diagram illustrating an exemplary system for encoding and decoding video blocks in accordance with some implementations of the present disclosure.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of forwarding the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may store the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or any combination thereof that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20, and the output interface 22. The video source 18 may include a source such as a video capturing device, e.g., a video camera, a video archive containing previously captured video, a video feeding interface to receive video data from a video content provider, and/or a computer graphics system for generating computer graphics data as the source video, or a combination of such sources. As one example, if the video source 18 is a video camera of a security surveillance system, the source device 12 and the destination device 14 may include camera phones or video phones. However, the implementations described in the present disclosure may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data for a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present disclosure is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
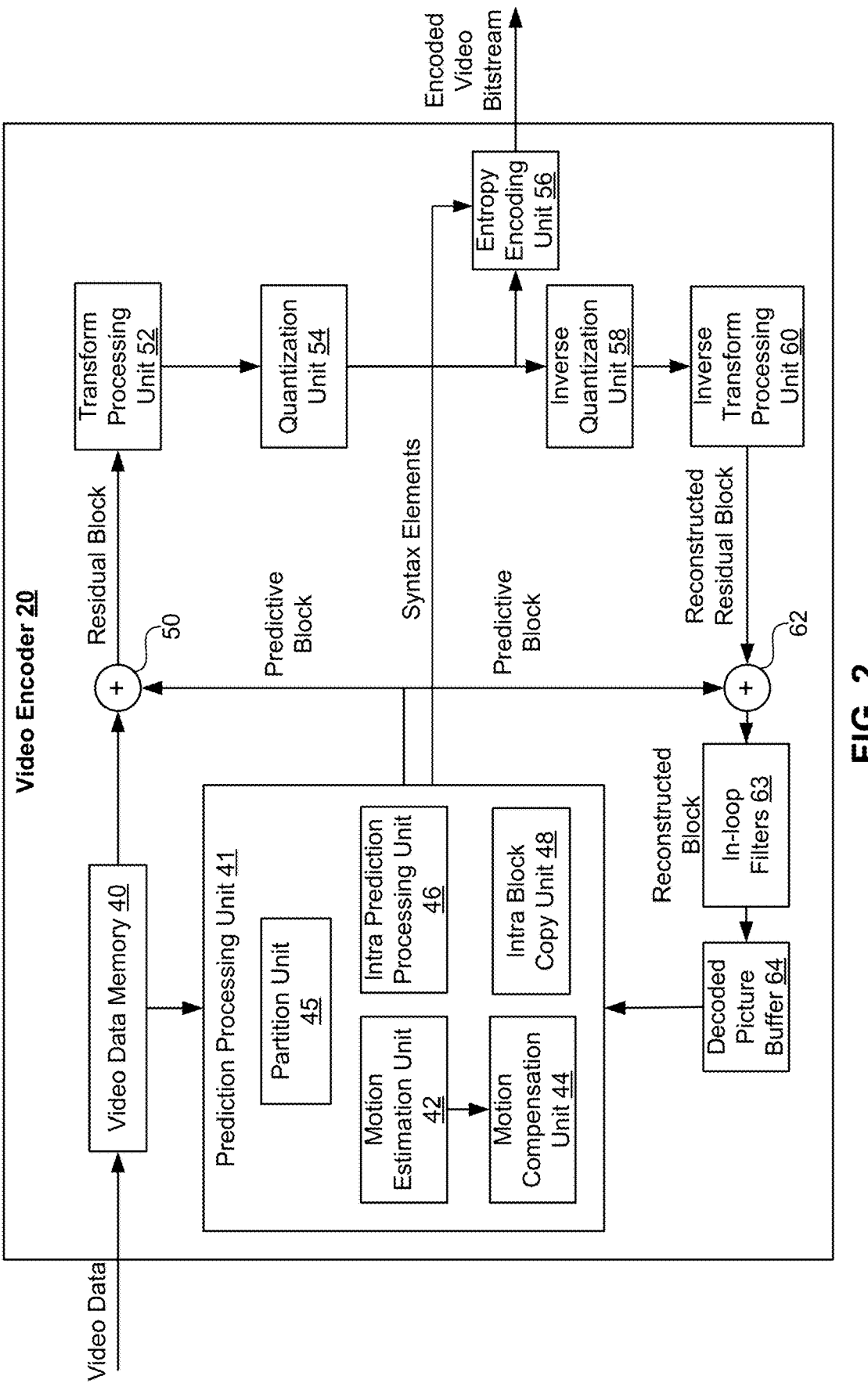
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove block artifacts from reconstructed video data. Another in-loop filter, such as an SAO filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning, Triple-Tree (TT) partitioning or any combination thereof. It should be noted that the term "block" or "video block" as used herein may be a portion, in particular a rectangular (square or non-square) portion, of a frame or a picture. With reference to, for example, HEVC and VVC, the block or video block may be or correspond to a Coding Tree Unit (CTU), a CU, a Prediction Unit (PU), or a Transform Unit (TU), and/or may be or correspond to a corresponding block, e.g., a Coding Tree Block (CTB), a Coding Block (CB), a Prediction Block (PB), or a Transform Block (TB). Alternatively or additionally, the block or video block may be or correspond to a sub-block of a CTB, a CB, a PB, a TB, etc.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block (e.g., a predictive block) to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference frame, according to a predetermined pattern within a sequence of video frames. Motion estimation, performed by the motion estimation unit 42, may be a process of generating motion vectors, which may estimate motion for video blocks. A motion vector, for example, may indicate the displacement of a video block within a current video frame or picture relative to a predictive block within a reference frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vectors.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual block of pixel difference values by subtracting pixel values of the predictive block provided by the motion compensation unit 44 from the pixel values of the current video block being coded. The pixel difference values forming the residual block may include luma or chroma component differences or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. It is noted that the motion estimation unit 42 and the motion compensation unit 44 may be integrated together, which are illustrated separately for conceptual purposes in FIG. 2.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or from a different frame according to inter prediction, the video encoder 20 may form a residual block by subtracting pixel values of the predictive block from the pixel values of the current video block being coded, forming pixel difference values. The pixel difference values forming the residual block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. For example, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in a bitstream.

After the prediction processing unit 41 determines the predictive block for the current video block via either inter prediction or intra prediction, the summer 50 forms a residual block by subtracting the predictive block from the current video block. The residual video data in the residual block may be included in one or more TUs and is provided to the transform processing unit 52. The transform processing unit 52 transforms the residual video data into transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 may use an entropy encoding technique to encode the quantized transform coefficients into a video bitstream, e.g., using Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding, or another entropy encoding methodology or technique. The encoded bitstream may then be transmitted to the video decoder 30 as shown in FIG. 1 or archived in the storage device 32 as shown in FIG. 1 for later transmission to or retrieval by the video decoder 30. The entropy encoding unit 56 may also use an entropy encoding technique to encode the motion vectors and the other syntax elements for the current video frame being coded.

The inverse quantization unit 58 and the inverse transform processing unit 60 apply inverse quantization and inverse transformation, respectively, to reconstruct the residual block in the pixel domain for generating a reference block for prediction of other video blocks. A reconstructed residual block may be generated thereof. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42, and the motion compensation unit 44 as a predictive block to inter predict another video block in a subsequent video frame.

Figure 3:
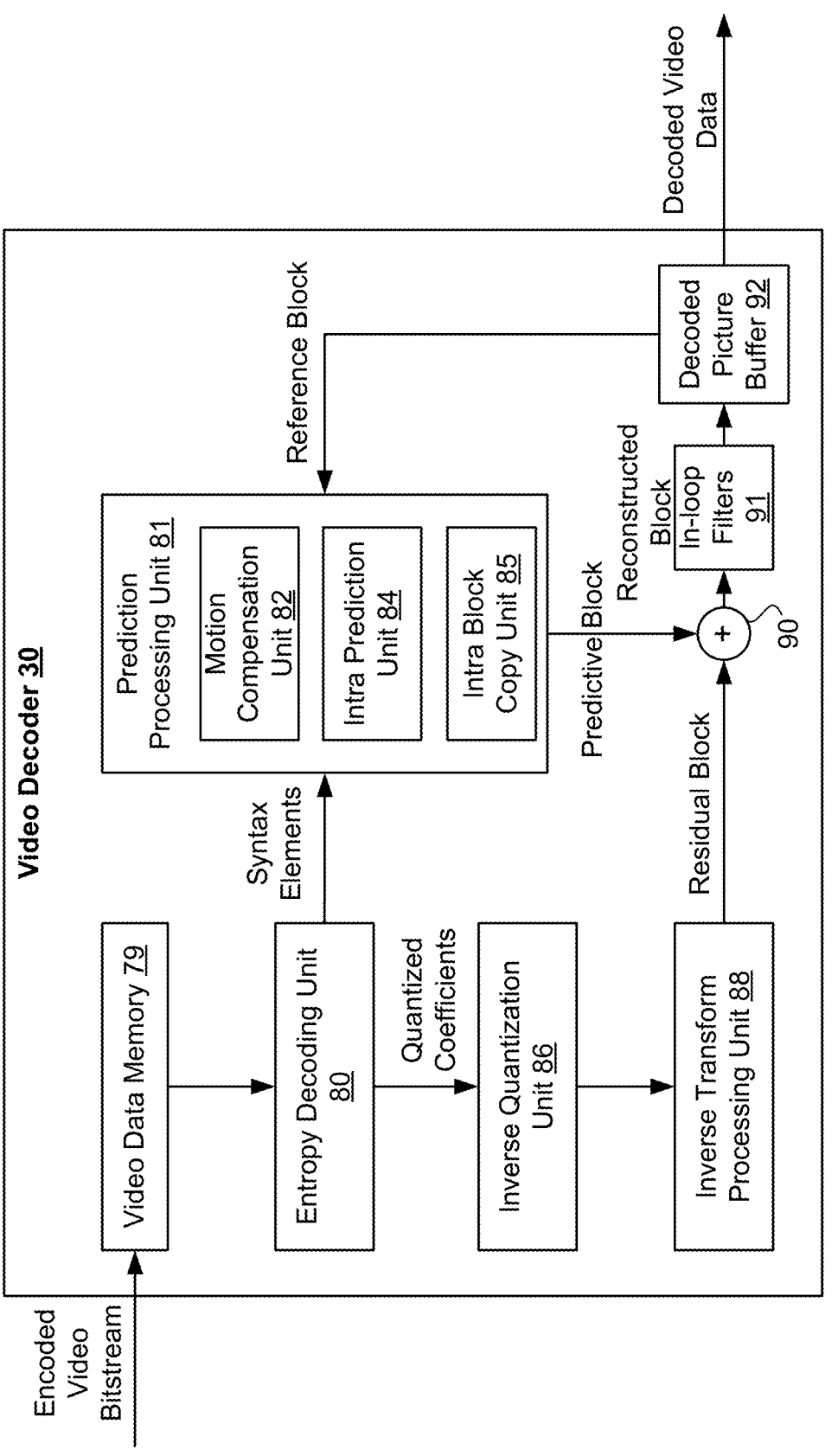
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 may use an entropy decoding technique to decode the bitstream to obtain quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (e.g., I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, e.g., List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block processed by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inversely quantizes the quantized transform coefficients provided in the bitstream and decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs a decoded video block for the current video block by summing the residual block from the inverse transform processing unit 88 and a corresponding predictive block generated by the motion compensation unit 82 and the intra BC unit 85. The decoded video block may also be referred to as a reconstructed block for the current video block. An in-loop filter 91 such as a deblocking filter, SAO filter, and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process (e.g., including a video encoding process and a video decoding process), a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
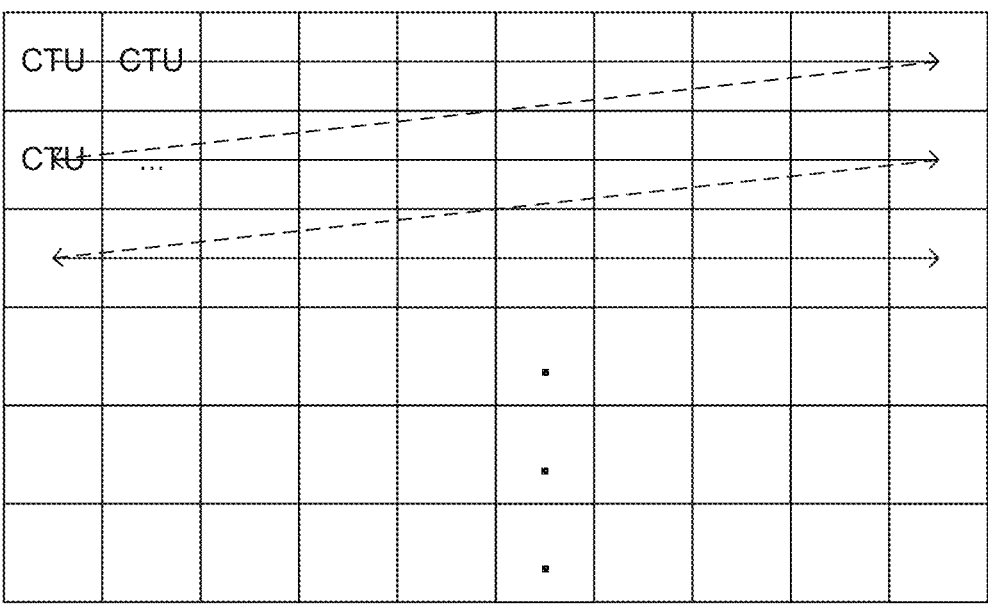
FIGS. 4A through 4E are graphical representations illustrating how a frame is recursively partitioned into multiple video blocks of different sizes and shapes in accordance with some implementations of the present disclosure.
Figure 4B:
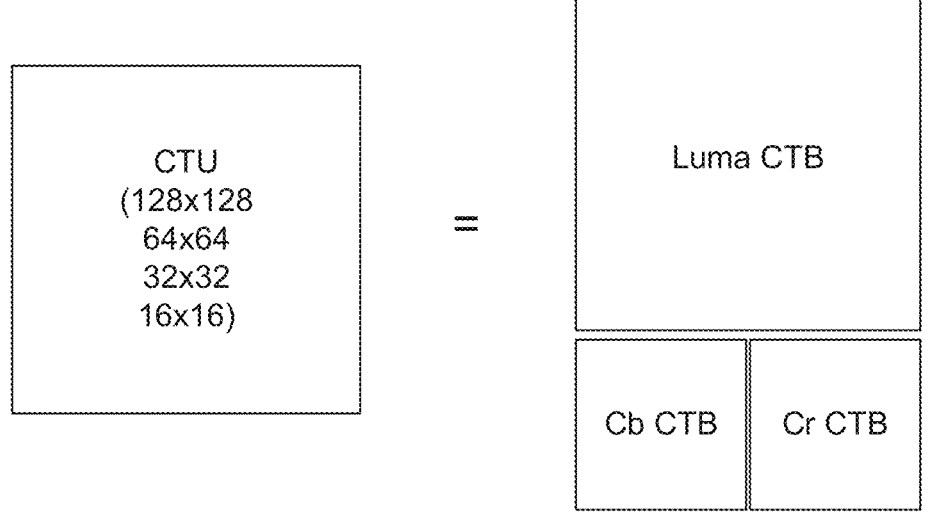

As shown in FIG. 4A, the video encoder 20 (or more specifically the partition unit 45) generates an encoded representation of a frame by first partitioning the frame into a set of CTUs. A video frame may include an integer number of CTUs arranged consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that a CTU in the present disclosure is not necessarily limited to a particular size. As shown in FIG. 4B, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

Figure 4C:
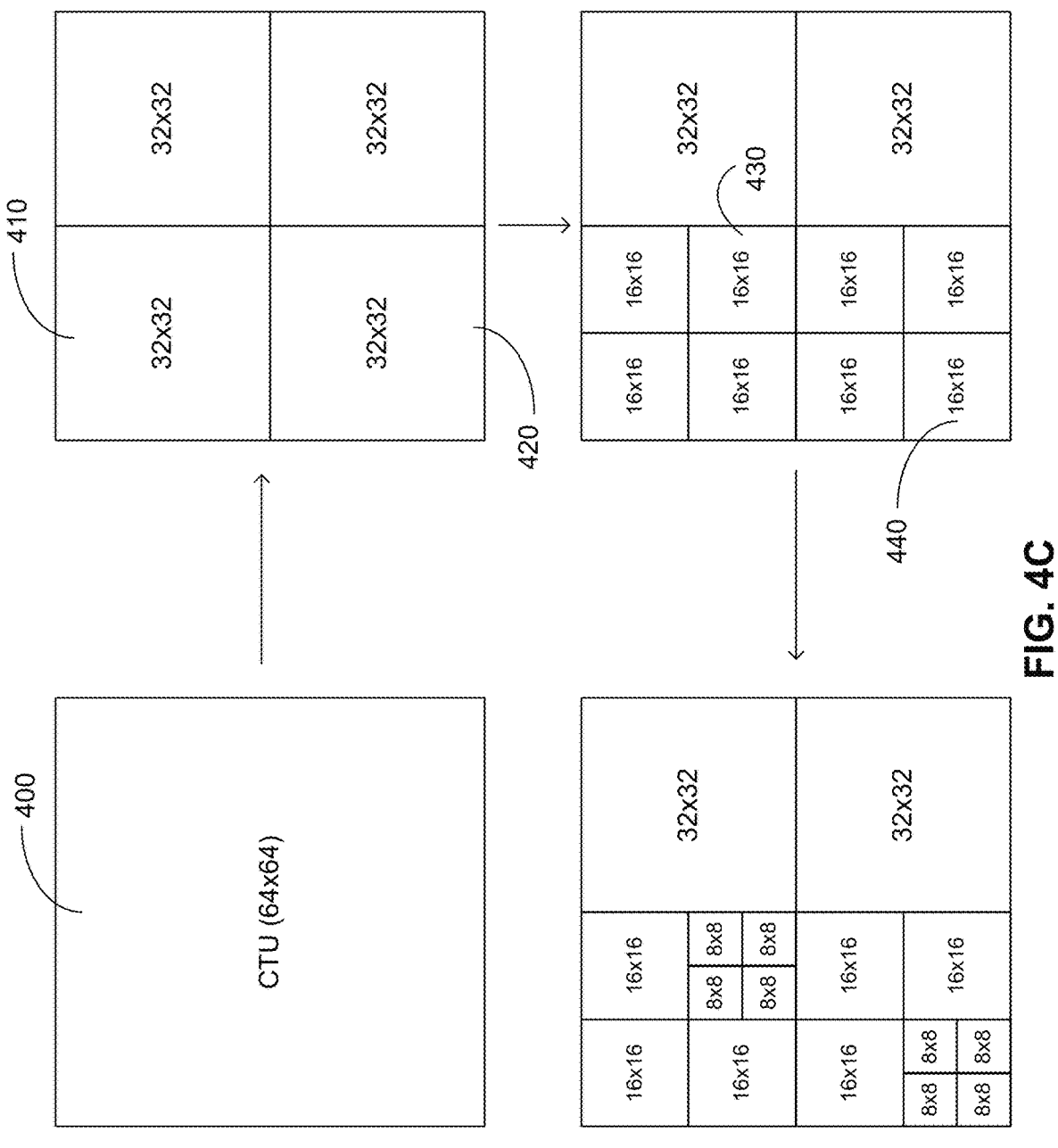
Figure 4D:
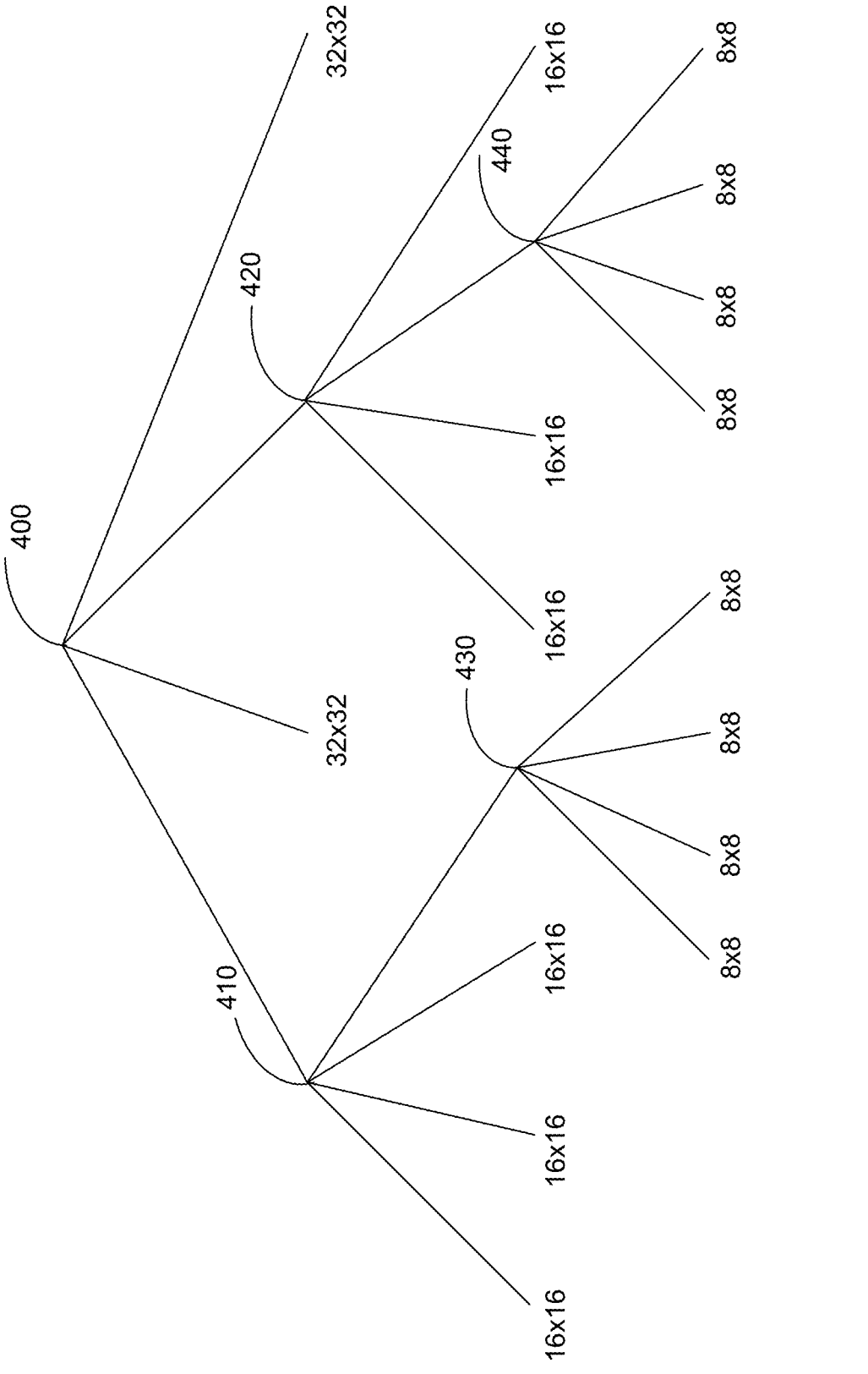
Figure 4E:
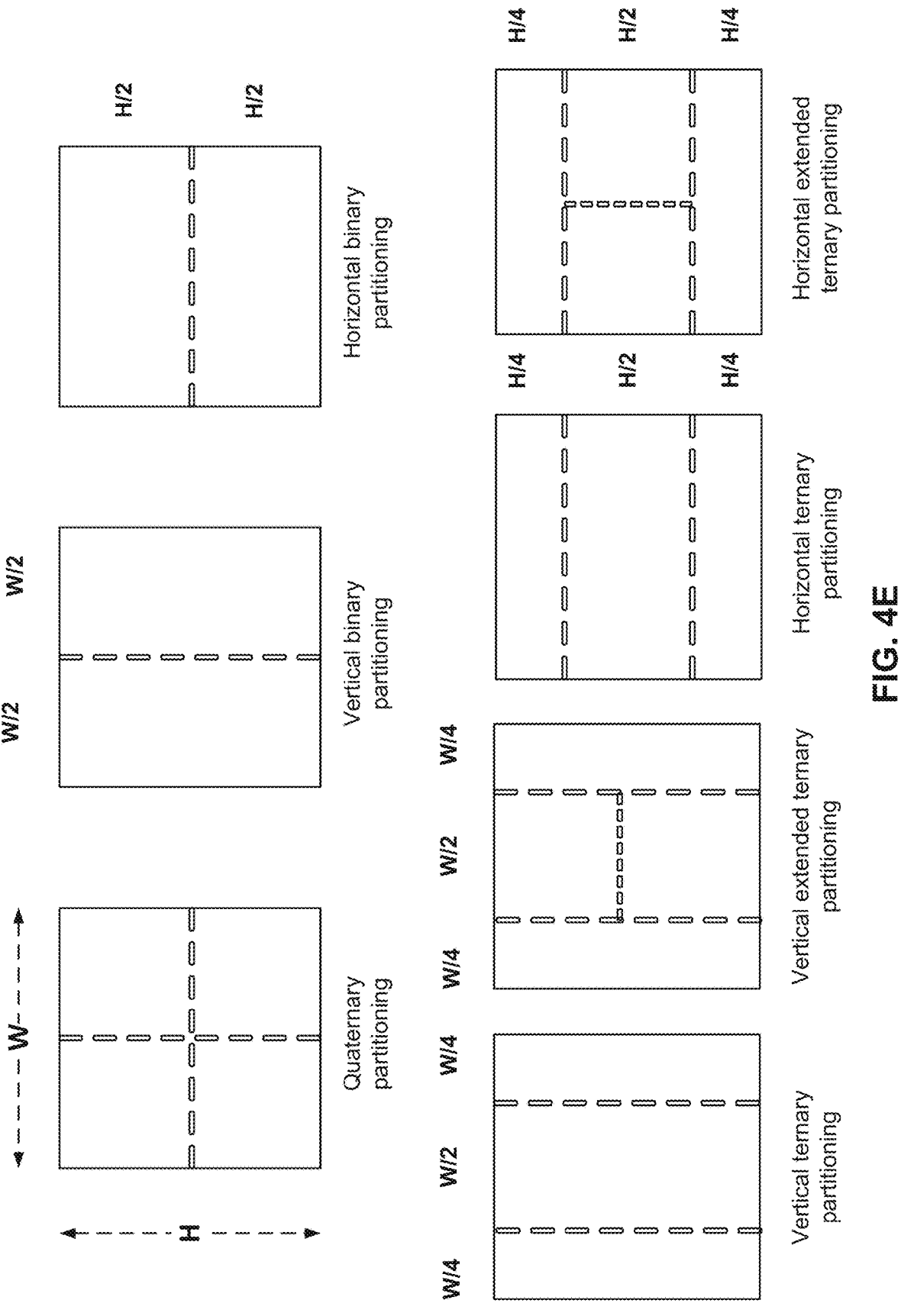

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may include a CB of luma samples and two corresponding coding blocks of chroma samples of a frame of the same size, and syntax elements used to code the samples of the coding blocks. In monochrome pictures or pictures having three separate colour planes, a CU may include a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are multiple possible partitioning types of a coding block having a width W and a height H, i.e., quaternary partitioning, vertical binary partitioning, horizontal binary partitioning, vertical ternary partitioning, vertical extended ternary partitioning, horizontal ternary partitioning, and horizontal extended ternary partitioning.

In some implementations, the video encoder 20 may further partition a coding block of a CU into one or more M×N PBs. A PB may include a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block, and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block may include a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may apply an entropy encoding technique to encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that form a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that intra block copy (IBC) could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding an actual motion vector of the current CU into the video bitstream (e.g., the actual motion vector being determined by the motion estimation unit 42 as described above in connection with FIG. 2), the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream, and the amount of data used for representing motion information in the video bitstream can be significantly decreased.

Like the process of choosing a predictive block in a reference frame during inter-frame prediction of a code block, a set of rules can be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30, and an index of the selected motion vector predictor within the motion vector candidate list is sufficient for the video encoder 20 and the video decoder 30 to use the same motion vector predictor within the motion vector candidate list for encoding and decoding the current CU. Thus, only the index of the selected motion vector predictor needs to be sent from the video encoder 20 to the video decoder 30.

Figure 5A:
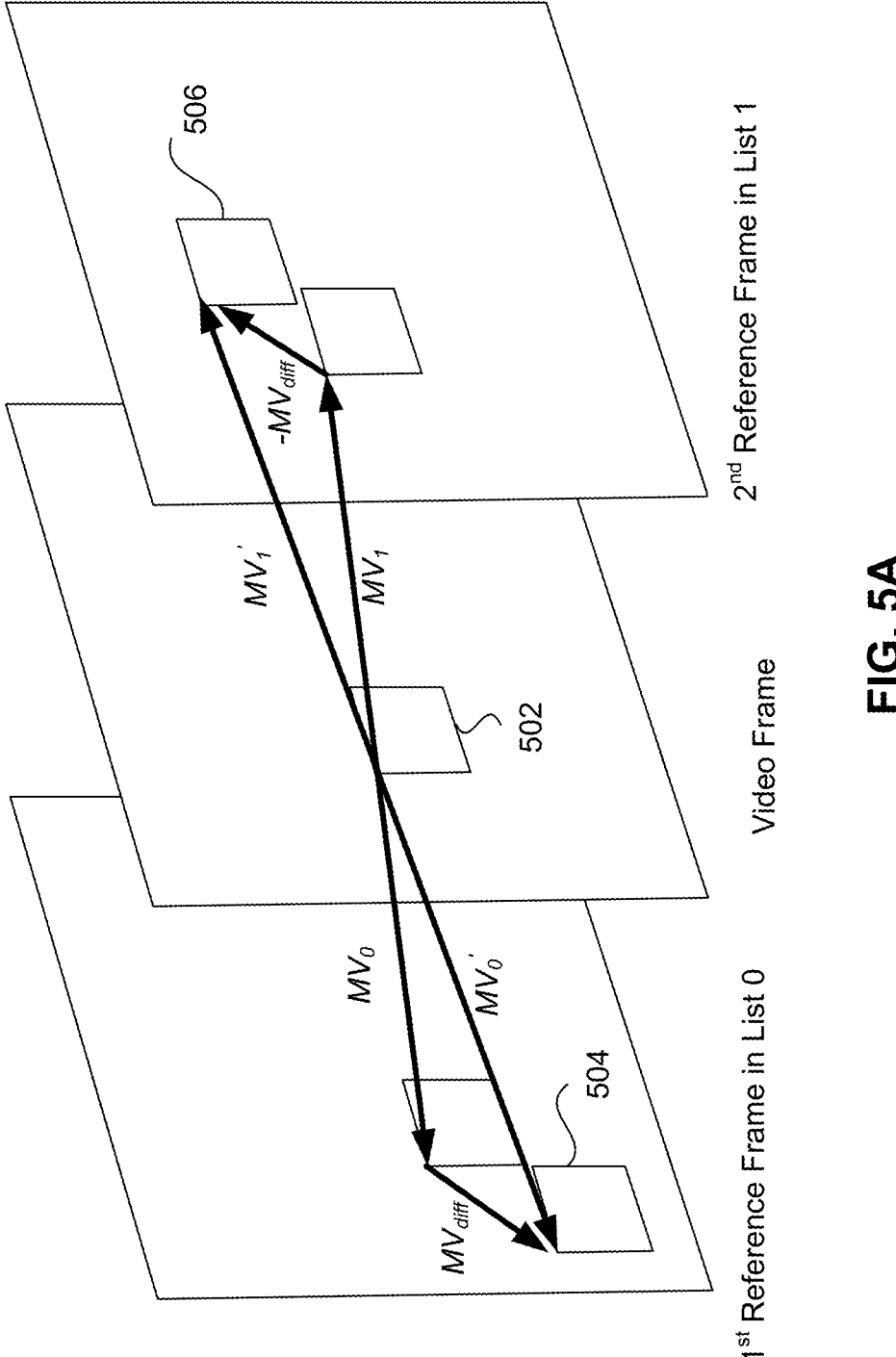
FIG. 5A illustrates exemplary motion vector refinement on a video decoder side in accordance with some implementations of the present disclosure.

FIG. 5A illustrates exemplary decoder side motion vector refinement (DMVR) in accordance with some implementations of the present disclosure. To increase the accuracy of the motion vectors (MVs) of a merge mode, a bilateral matching (BM) based decoder side motion vector refinement is applied in VVC. In a bi-prediction scheme, refined MVs are searched around initial MVs in a first reference frame list (List 0) or a second reference frame list (List 1). Then, bilateral matching can be used to calculate a distortion (e.g., a distance) between two reference blocks that are in the reference frame lists L0 and L1, respectively.

For example, as illustrated in FIG. 5A, an initial MV pair for a video block 502 in a video frame is denoted as (MV0, MV1), and a candidate MV pair for video block 502 is denoted as (MV0', MV1'). A first reference block 504 from a first reference frame in List 0 and a second reference block 506 from a second reference frame in List 1 can be determined for video block 502 based on the candidate MV pair (MV0', MV1'). Then, a matching cost (e.g., an SAD) between first reference block 504 and second reference block 506 for the candidate MV pair (MV0', MV1') can be determined. By performing similar operations, a plurality of matching costs for all the candidate MV pairs around the initial MV pair can be calculated, respectively. As a result, a candidate MV pair with a minimal matching cost among the plurality of matching costs can be selected to be a refined MV pair for video block 502 and used to generate corresponding predictive blocks for video block 502. The refined MV pair can be used to generate the inter prediction samples, and can also be used in temporal motion vector prediction for coding future pictures.

In DMVR, the search points for the candidate MV pairs are surrounding the initial MV pair, and corresponding MV offsets follow an MV difference mirroring rule. For example, each candidate MV pair follows the following two equations:

$$MV0' = MV0 + MV\_offset \quad (1)$$

$$MV1' = MV1 - MV\_offset. \quad (2)$$

In the above equations (1) and (2), MV_offset (e.g., $MV_{diff}$ in FIG. 5A) represents a refinement offset between an initial MV and a candidate MV in the first reference frame, whereas a refinement offset between an initial MV and a candidate MV in the second reference frame is −MV_offset (e.g., $−MV_{diff}$ in FIG. 5A). A refinement search range is two integer luma samples from the initial MV. The searching process may include an integer sample offset search stage and a fractional sample refinement stage.

Figure 5B:
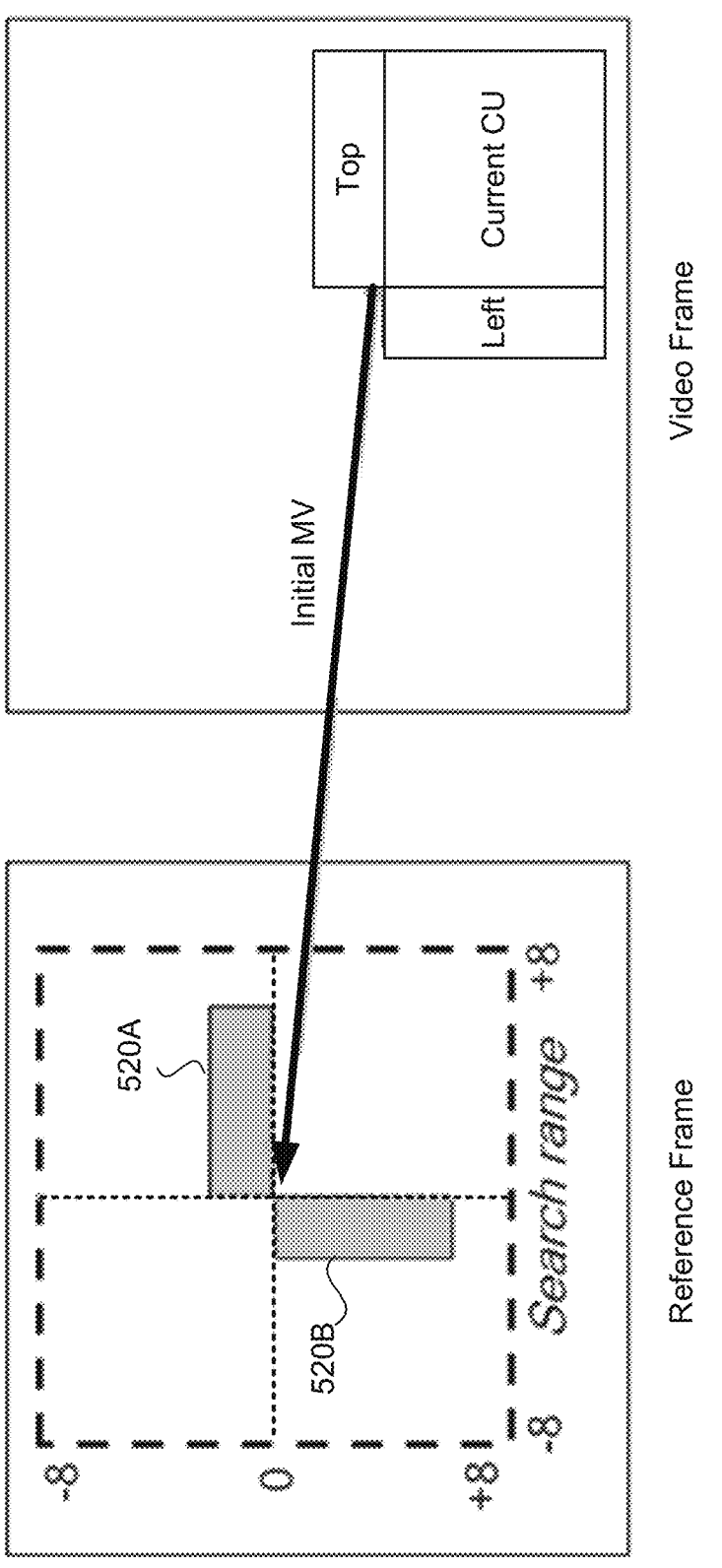
FIG. 5B illustrates a template matching technique performed on a search area around an initial motion vector in accordance with some implementations of the present disclosure.

FIG. 5B illustrates a template matching (TM) technique performed on a search area around an initial motion vector in accordance with some implementations of the present disclosure. The template matching technique is a decoder-side MV derivation method configured to refine motion information of a current video block (e.g., a current CU) by finding the closest match between a template in a current video frame and a reference region in a reference frame. For example, as illustrated in FIG. 5B, a template can include a top neighboring block and/or a left neighbouring block of the current CU in the current video frame. A reference region of the template may have the same size as the template and may include a first reference block and/or a second reference block determined by a motion vector candidate from a reference frame. For example, a reference region shown in FIG. 5B includes a first reference block 520A and/or a second reference block 520B determined by an initial motion vector (denoted as initial MV) of the current CU from the reference frame. The motion vector candidate can be within a [−8, +8]-pel search range (e.g., a refined motion vector can be searched around the initial motion vector of the current CU within a [−8, +8]-pel search range). The template matching technique in JVET-J0021 is used with the following modifications: (a) a search step size is determined based on an adaptive motion vector resolution (AMVR) mode; and (b) the template matching technique can be cascaded with a bilateral matching process in merge modes.

In an advanced motion vector prediction (AMVP) mode, a motion vector predictor (MVP) candidate can be determined based on a template matching error, such that the MVP candidate which has the minimum difference between the template and a corresponding reference region can be selected. Then, the template matching technique can be performed for this MVP candidate for MV refinement. For example, the template matching technique can refine this MVP candidate by starting from full-pel MVD precision (or 4-pel for 4-pel AMVR mode) within a [−8, +8]-pel search range using an iterative diamond search. The MVP candidate may be further refined by using cross search with full-pel MVD precision (or 4-pel for 4-pel AMVR mode), followed sequentially by half-pel and quarter-pel ones depending on the AMVR mode as specified in the following Table 1. This search process ensures that the MVP candidate keeps the same MV precision as indicated by the AMVR mode after the template matching process.

TABLE 1

Search patterns of AMVR and merge mode with AMVR.

| | AMVR mode | | | | Merge mode | |
| Search pattern | 4-pel | Full-pel | Half-pel | Quarter-pel | AltIF = 0 | AltIF = 1 |
|---|---|---|---|---|---|---|
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In the merge mode, a similar search method can be applied to a merge candidate indicated by a merge index. As Table 1 shows, template matching may perform all the way down to ⅛-pel MVD precision or skipping those beyond half-pel MVD precision, depending on whether an alternative interpolation filter is used according to merged motion information. In some examples, the alternative interpolation filter is used when AMVR is of half-pel mode. Besides, when a template matching mode is enabled, the template matching may work as an independent process or an extra MV refinement process between block-based and subblock-based bilateral matching methods, depending on whether the bilateral matching can be enabled or not according to its enabling condition check.

Consistent with some implementations of the present disclosure, coding efficiency of inter-prediction can be improved from various aspects. In one aspect, the accuracy of inter-prediction can be improved with more advanced prediction modes, such as an affine motion model, a combine intra and inter prediction, a geometry partitioning mode, and so on. In another aspect, the motion information (e.g., especially motion vectors) can be refined at the decoder side without signaling additional overheads. This kind of improvement profits from the template matching technique and the bilateral matching technique. In yet another aspect, more efficient coding methods for the motion information can be utilized. For example, advanced motion vector prediction techniques (such as Subblock-based Temporal Motion Vector Prediction (SbTMVP) and History-based Motion Vector Prediction (HMVP) techniques) can reduce the overhead of motion vectors. Also, the AMVR technique can achieve a better trade-off between motion vector accuracy and motion compensation efficiency by applying different motion vector resolutions for different CUs.

Although the motion information can be coded with better predictors in the advanced motion vector prediction techniques, there are still some syntax elements needed to be signaled, like MVDs and reference indices. However, coding of the MVDs and the reference indices are less investigated in existing technologies. Since the motion vectors can be refined at the decoder side using DMVR techniques, it is also appealing to predict the MVDs and/or the reference indices at the decoder side with the template matching technique or the bilateral matching technique.

Consistent with some implementations of the present disclosure, a video processing method and apparatus are disclosed herein for decoder side motion information prediction with the template or bilateral matching technique, so that one or more motion related parameters for a video block in a video frame of a video can be derived on the decoder side. By way of examples, the one or more motion related parameters may include one or more reference indices, one or more MVDs for the video block, and/or any other motion related parameters. By exploiting the template matching technique or the bilateral matching technique, the video processing method and apparatus disclosed herein can reduce the signaling overhead of the one or more motion related parameters. Therefore, the coding efficiency of the motion information can be improved.

For example, with respect to the merge mode, only a merge flag and a merge index need to be signaled. As a result, less bits are signaled in the merge mode with the sacrificing of prediction quality when compared with existing designs of the AMVP mode. On the contrary, in the existing designs of the AMVP mode, various parameters are needed to be signaled for each video block, including an inter prediction direction (e.g., uni-prediction or bi-prediction), an AMVP index used to identify a motion vector predictor, one or more reference indices used to identify one or more reference frames, and one or more MVDs. However, the video processing method and apparatus disclosed herein can save the bits produced from the signaling of the one or more reference indices and/or the one or more MVDs by deriving or predicting the one or more reference indices and/or the one or more MVDs on the decoder side.

Besides, the video processing method and apparatus disclosed herein assume that samples in a current video block (e.g., a current prediction unit (PU)) share similar motion information with samples of a neighboring block. That is, the more accurate the derived motion information is, the smaller cost of the template or bilateral matching technique has.

In some implementations, the video processing method and apparatus disclosed herein may perform an MVD prediction on the decoder side using a coding matching technique. The coding matching technique can be the template matching technique or the bilateral matching technique. Depending on the inter prediction direction of the video block, either the template matching technique or the bilateral matching technique can be selected to perform the MVD prediction. For example, when the video block is coded with uni-prediction using the AMVP mode, the template matching technique can be applied to derive an MVD for the video block as described below in more details. In another example, when the video block is coded with bi-prediction using the AMVP mode, the bilateral matching technique disclosed herein can be applied to derive one or more MVDs for the video block as described below in more details.

In some implementations, the video processing method and apparatus disclosed herein may perform a reference index derivation on the decoder side, such that the one or more reference indices associated with the video block do not need to be signaled to the video decoder. Depending on the inter prediction direction of the video block, either the template matching technique or the bilateral matching technique can be selected to perform the reference index derivation. For example, when the video block is coded with uni-prediction using the AMVP mode, the template matching technique disclosed herein can be applied to derive a reference index for the video block as described below in more detail. In another example, when the video block is coded with bi-prediction using the AMVP mode, the bilateral matching technique disclosed herein can be applied to derive one or more reference indices for the video block as described below in more detail.

Figures 6A, 6B:
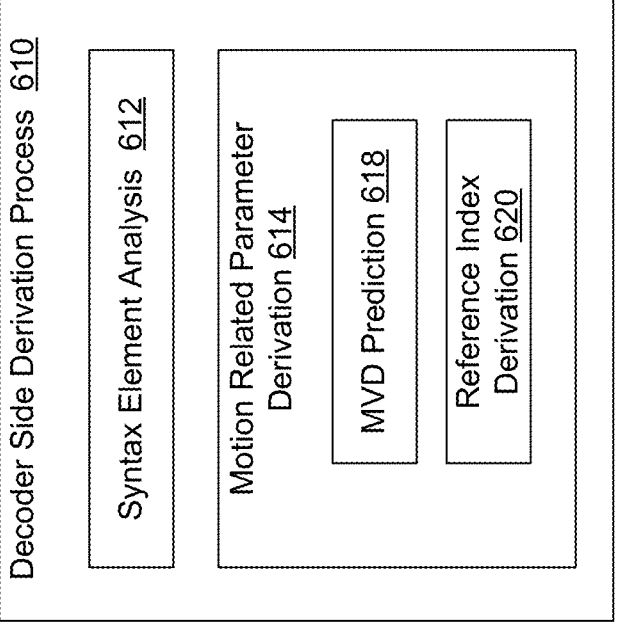
FIG. 6A is a block diagram illustrating an exemplary encoder side coding process in accordance with some implementations of the present disclosure.
FIG. 6B is a block diagram illustrating an exemplary decoder side derivation process in accordance with some implementations of the present disclosure.
Figure 13:
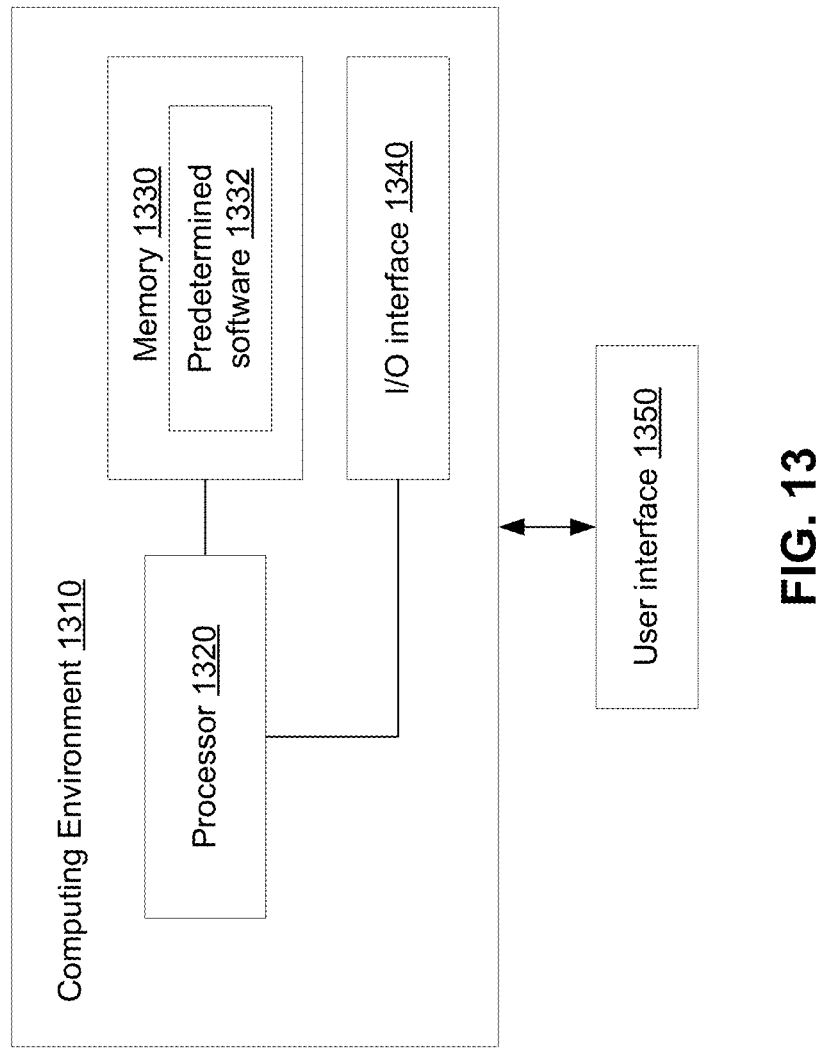
FIG. 13 is a block diagram illustrating a computing environment coupled with a user interface in accordance with some implementations of the present disclosure.

FIG. 6A is a block diagram illustrating an exemplary encoder side coding process 600 in accordance with some implementations of the present disclosure. In some implementations, encoder side coding process 600 can be performed by prediction processing unit 41 of video encoder 20. In some implementations, encoder side coding process 600 may be performed by a processor (e.g., a processor 1320 as shown in FIG. 13) on the encoder side. For illustration purpose only, the following description of FIG. 6A is provided with respect to the processor on the encoder side. By the execution of encoder side coding process 600, one or more motion related parameters associated with a video block do not need to be signaled to video decoder 30, such that the one or more motion related parameters can be derived on the decoder side. For illustration purpose only, FIG. 6A is described herein by taking one or more MVDs and/or one or more reference indices as examples of the one or more motion related parameters. It is contemplated that the description provided herein is also applied to other examples of the one or more motion related parameters, which is not limited herein. In some implementations, encoder side coding process 600 may include an MVD coding 602 and a syntax element generation 608.

In inter-prediction, a motion vector is used to indicate a relative location of a reference block in a reference frame for the video block in the current video frame. To improve the coding efficiency of the motion vector, the AMVP technique can be utilized to indicate a motion vector predictor for the motion vector with an AMVP index. Then, an MVD can be calculated to be a difference between the motion vector and the motion vector predictor (e.g., MVD=the motion vector− the motion vector predictor). In an existing design of the AMVP technique, the AMVP index and the MVD (rather than the motion vector) are signaled from video encoder 20 to video decoder 30.

In the VVC standard and ECM, the MVD is coded by: (a) dividing the MVD into two parts including a sign of the MVD (denoted as a syntax element "mvd_sign_flag") and an absolute value of the MVD (denoted as a syntax element "abs_mvd_minus2"); and (b) coding the sign of the MVD and the absolute value of the MVD separately. The sign of MVD is coded with a bypass mode while the absolute value of MVD can be coded as described in the following Table 2.

TABLE 2 syntax element description for MVD coding

|  | Descriptor |
|---|---|
| mvd_coding( x0, y0, refList, cpIdx ) { | |
| abs_mvd_greater0_flag[ 0 ] | ae(v) |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] ) | |
| abs_mvd_greater1_flag[ 1 ] | ae(v) |
| if( abs_mvd_greater0_flag[ 0 ] ) { | |
| if( abs_mvd_greater1_flag[ 0 ] ) | |
| abs_mvd_minus2[ 0 ] | ae(v) |
| mvd_sign_flag[ 0 ] | ae(v) |
| } | |
| if( abs_mvd_greater0_flag[ 1 ] ) { | |
| if( abs_mvd_greater1_flag[ 1 ] ) | |
| abs_mvd_minus2[ 1 ] | ae(v) |
| mvd_sign_flag[ 1 ] | ae(v) |
| } | |
| } | |

It is noted that, in the existing design of the AMVP mode, if the MVD is greater than 1, the syntax element "abs_mvd_minus2" for the absolute value of the MVD is signaled with the Exponential-Golomb (EG) code. For each bin of "abs_mvd_minus2," the bypass mode is utilized to encode the bin, whereas the bypass mode is usually less effective. Consistent with some implementations of the present disclosure, the coding efficiency of the syntax element "abs_mvd_minus2" for the absolute value of the MVD may be improved by utilizing an efficient binarization method and context modeling described below in more detail.

In ECM, template matching is utilized to improve the coding efficiency of the merge mode and the motion vector prediction. For example, template matching is utilized to reorder the merge candidates and the AMVP candidates. Besides, in VVC, bilateral matching is utilized in the DMVR technique to refine the motion vectors in bi-prediction. Inspired by the above mentioned techniques, MVD coding 602 disclosed herein is applied to predict the absolute value of the MVD (abs_mvd_minus2) through a coding matching technique such as the template or bilateral matching technique. To achieve the prediction of the absolute value of the MVD through the coding matching technique, (a) a binarization method of the absolute value of the MVD (abs_mvd_minus2) and (b) a splitting of a bit plane of the absolute value of the MVD on the encoder side are disclosed herein. For example, MVD coding 602 described herein may include an absolute value binarization 604 and a bit plane splitting 606 for the MVD associated with the video block.

Figure 7:
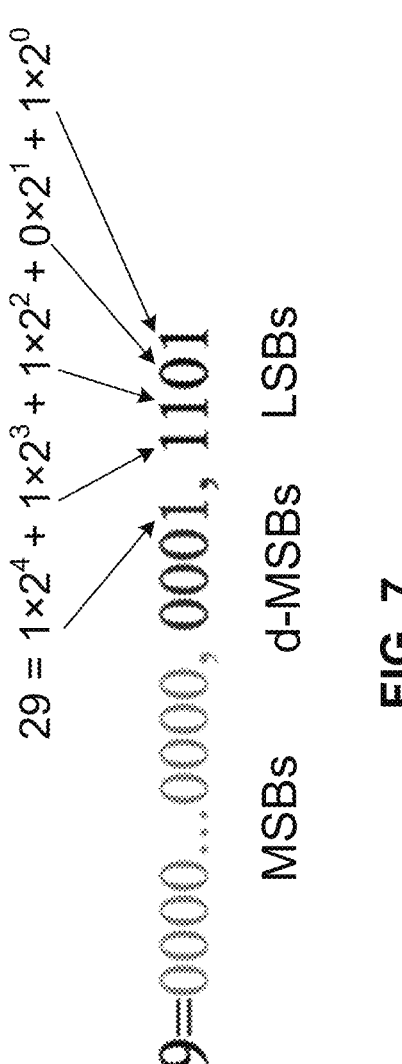
FIG. 7 is an illustration of an exemplary bit plane of an absolute value of a motion vector difference (MVD) in accordance with some implementations of the present disclosure.

To begin with MVD coding 602 for the video block, the processor on the encoder side may perform absolute value binarization 604 to binarize the absolute value of the MVD into a bit plane. In some implementations, the bit plane of the absolute value (abs_mvd_minus2) can be a direct binary representation of the absolute value rather than an EG code corresponding to the absolute value. The absolute value (abs_mvd_minus2) can be represented with a maximum of Q bits, where Q is a positive integer. For example, as illustrated in FIG. 7, a binary representation of abs_ mvd_minus2=29 is (0000, . . . , 0000, 0001, 1101) since $29=1\times2^4+1\times2^3+1\times2^2+0\times2^1+1\times2^0$.

Next, the processor on the encoder side may perform bit plane splitting 606 to divide the bit plane of the absolute value into a set of most significant bins (MSBs), a set of derived most significant bins (d-MSBs), and a set of least significant bins (LSBs). For example, as illustrated in FIG. 7, the bit plane of abs_mvd_minus2=29 is split into a set of MSBs (0000, . . . , 0000), a set of d-MSBs (0001), and a set of LSBs (1101).

Rather than transmitting the absolute value of the MVD to the video decoder directly, the processor may generate a reduced absolute value (denoted as "reduced_abs_mvd_minus2") based on the splitting of the absolute value and then transmit the reduced absolute value to video decoder 30. For example, the processor may generate the reduced absolute value by setting the set of d-MSBs to be all zeros. The reduced absolute value can be coded with EG code directly and transmitted to video decoder 30. That is, the set of d-MSBs may not be transmitted to video decoder 30, and only the set of MSBs and the set of LSBs may be signaled to video decoder 30 through the bitstream. Since the reduced absolute value is smaller than the absolute value, less bits are used to transmit the reduced absolute value so that the signaling overhead can be reduced. In some examples, the set of MSBs are all zeros. In this case, only the set of LSBs are transmitted to video decoder 30, and the signaling overhead can be further reduced. On the decoder side, the set of d-MSBs can be derived as described below in more detail with reference to FIG. 6B, so that the set of d-MSBs derived on the decoder side and the reduced absolute value received from video encoder 20 can be used to reconstruct the absolute value of the MVD on the decoder side.

Some considerations regarding the splitting of the bit plane are disclosed herein. For example, as described below with reference to FIG. 6B, when deriving the set of d-MSBs on the decoder side, the number of motion vector candidates to be checked on the decoder side is exponential to a length of the d-MSBs. Therefore, if the length of the d-MSBs increases, more bits can be saved in the signaling but more motion vector candidates need to be checked on the decoder side, which may increase the computation complexity on the decoder side. In another example, a position where the d-MSBs start in the bit plane has an influence on the prediction accuracy of a matching cost when checking a particular motion vector candidate. If the d-MSBs locates at lower-order bits in the bit plane, the difference on the matching costs among the motion vector candidates can be smaller, which can make it more difficult to discriminate the motion vector candidates, and vice versa. In some implementations, the length of the d-MSBs and the position where the d-MSBs start in the bit plane can be set to be a fixed pattern (e.g., a fixed length, a fixed position, etc.). In some other implementations, the length of the d-MSBs and the position where the d-MSBs start in the bit plane can be indicated in the slice header as described in the following Table

TABLE 3 syntax element description in the slice header
for the length and position of d-MSBs

|  | Descriptor |
|---|---|
| slice_header( ) { | |
| sh_picture_header_in_slice_header_flag | u(1) |

TABLE 3-continued

| syntax element description in the slice header for the length and position of d-MSBs | |
| --- | --- |
| | Descriptor |
| ... | ... |
| if( pps_deblocking_filter_override_enabled_flag && !pps_dbf_info_in_ph_flag ) | |
|   sh_deblocking_params_present_flag | u(1) |
| if( sh_deblocking_params_present_flag ) { | |
|   if( !pps_deblocking_filter_disabled_flag ) | |
|     sh_deblocking_filter_disabled_flag | u(1) |
|   if( !sh_deblocking_filter_disabled_flag ) { | |
|     sh_luma_beta_offset_div2 | se(v) |
|     sh_luma_tc_offset_div2 | se(v) |
|     if( pps_chroma_tool_offsets_present_flag ) { | |
|       sh_cb_beta_offset_div2 | se(v) |
|       sh_cb_tc_offset_div2 | se(v) |
|       sh_cr_beta_offset_div2 | se(v) |
|       sh_cr_tc_offset_div2 | se(v) |
|     } | |
|   } | |
| } | |
| if(sps_mvd_minus2_derivation_flag){ | |
|   sh_derived_msb_length | se(v) |
|   sh_derived_msb_pos | se(v) |
| } | |
| if( sps_dep_quant_enabled_flag ) | |
|   sh_dep_quant_used_flag | u(1) |
| if( sps_sign_data_hiding_enabled_flag && !sh_dep_quant_used_flag ) | |
|   sh_sign_data_hiding_used_flag | u(1) |
| ... | ... |
|   byte_alignment( ) | |
| } | |

With respect to syntax element generation 608, the processor on the encoder side may generate one or more syntax elements and may signal the one or more syntax elements to video decoder 30, so that the one or more syntax elements can be used for performing MVD prediction and/or reference index derivation on the decoder side.

For example, a syntax element "mvd_derivation_flag" can be generated and signaled for each video block to indicate whether MVD prediction is applied to the video block. If "mvd_derivation_flag" is true, then the MVD prediction is applied to the video block, leading to one or more MVDs of the video block to be derived on the decoder side. For example, for each MVD to be derived, a set of d-MSBs for an absolute value "abs_mvd_minus2" of the MVD is to be derived on the decoder side (rather than being signaled to video decoder 30). If "mvd_derivation_flag" is false, then the MVD prediction is not applied to the video block. In this case, the one or more MVDs of the video block are not derived on the decoder side. For example, for each MVD, the absolute value "abs_mvd_minus2" of the MVD is coded with EG code and signaled to video decoder 30. The following Table 4 is provided to describe some exemplary syntax elements of the MVD prediction disclosed herein.

TABLE 4

| syntax element description of the disclosed MVD prediction | |
| --- | --- |
| | Descriptor |
| mvd_coding( x0, y0, refList, cpIdx ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater1_flag[ 0 ] \|\| abs_mvd_greater1_flag[ 1 ]){ | |
|     derive_abs_mvd_minus2_flag | ae(v) |
|   } | |
|   if (derive_abs_mvd_minus2_flag) { | |
|     if( abs_mvd_greater0_flag[ 0 ] ) { | |
|       if( abs_mvd_greater1_flag[ 0 ] ) | |
|         reduced_abs_mvd_minus2[ 0 ] | ae(v) |
|       mvd_sign_flag[ 0 ] | ae(v) |
|     } | |
|     if( abs_mvd_greater0_flag[ 1 ] ) { | |
|       if( abs_mvd_greater1_flag[ 1 ] ) | |
|         reduced_abs_mvd_minus2[ 1 ] | ae(v) |
|       mvd_sign_flag[ 1 ] | ae(v) |
|     } | |
|   else { | |
|     if( abs_mvd_greater0_flag[ 0 ] ) { | |
|       if( abs_mvd_greater1_flag[ 0 ] ) | |
|         abs_mvd_minus2[ 0 ] | ae(v) |
|       mvd_sign_flag[ 0 ] | ae(v) |
|     } | |
|     if( abs_mvd_greater0_flag[ 1 ] ) { | |
|       if( abs_mvd_greater1_flag[ 1 ] ) | |
|         abs_mvd_minus2[ 1 ] | ae(v) |
|       mvd_sign_flag[ 1 ] | ae(v) |
|     } | |
|   } | |
| } | |

In another example, a syntax element "derive_ref_idx_flag" can be generated and signaled for each video block to indicate whether reference index derivation is applied to the video block. If "derive_ref_idx_flag" is true, then the reference index derivation is applied. In this case, one or more reference indices associated with the video block are derived on the decoder side (rather than being signaled to video decoder 30). If "derive_ref_idx_flag" is false, then the reference index derivation is not applied to the video block. In this case, the one or more reference indices associated with the video block are signaled to video decoder 30. The following Table 5 is provided to describe some exemplary syntax elements of the reference index derivation.

TABLE 5

| syntax element description of the disclosed reference index derivation | |
| --- | --- |
| | Descriptor |
| coding_unit( x0, y0, cbWidth, cbHeight, cqtDepth, treeType, modeType ) { | |
|   if( sh_slice_type = = I && ( cbWidth > 64 \|\| cbHeight > 64 ) ) | |
|     modeType = MODE_TYPE_INTRA | |
|   chType = treeType = = DUAL_TREE_CHROMA ? 1 : 0 | |
|   ... | ... |
|   pred_mode_plt_flag | ae(v) |

TABLE 5-continued

| | |
|---|---|
| syntax element description of the disclosed reference index derivation | |
| | Descriptor |
| if( CuPredMode[ chType ][ x0 ][ y0 ]   = = MODE_INTRA   &&<br>sps_act_enabled_flag   &&<br>   treeType = = SINGLE_TREE )<br>   cu_act_enabled_flag | ae(v) |
|   if(  CuPredMode[ chType ][ x0 ][ y0 ]   = = MODE_INTRA   \|\|<br>      CuPredMode[ chType ][ x0 ][ y0 ] = = MODE_PLT ) { | |
|    ... | ... |
|   } else if( treeType != DUAL_TREE_CHROMA ) { /* MODE_INTER or<br>MODE_IBC */ | |
|     if( cu_skip_flag[ x0 ][ y0 ] = = 0 ) | |
|      general_merge_flag[ x0 ][ y0 ] | ae(v) |
|     if( general_merge_flag[ x0 ][ y0 ] ) | |
|      merge_data( x0, y0, cbWidth, cbHeight, chType ) | |
|     else if( CuPredMode[ chType ][ x0 ][ y0 ] = = MODE_IBC ) { | |
|      mvd_coding( x0, y0, 0, 0 ) | |
|      if( MaxNumIbcMergeCand > 1 ) | |
|       mvp_l0_flag[ x0 ][ y0 ] | ae(v) |
|      if( sps_amvr_enabled_flag &&<br>      ( MvdL0[ x0 ][ y0 ][ 0 ] != 0 \|\| MvdL0[ x0 ][ y0 ][ 1 ] != 0 ) )<br>      amvr_precision_idx[ x0 ][ y0 ] | ae(v) |
|     } else {<br>     if( sh_slice_type = = B )<br>     inter_pred_idc[ x0 ][ y0 ] | ae(v) |
|      if( sps_affine_enabled_flag && cbWidth >= 16 && cbHeight >=<br>16 ) { | |
|       inter_affine_flag[ x0 ][ y0 ] | ae(v) |
|       if( sps_6param_affine_enabled_flag &&<br>inter_affine_flag[ x0 ][ y0 ] )<br>      cu_affine_type_flag[ x0 ][ y0 ] | ae(v) |
|      }<br>   if(sps_derive_ref_idx_flag) {<br>   derive_ref_idx_flag | ae(v) |
|    }<br>     if( sps_smvd_enabled_flag && !ph_mvd_l1_zero_flag &&<br>      inter_pred_idc[ x0 ][ y0 ]   = =   PRED_BI &&<br>      !inter_affine_flag[ x0 ][ y0 ]  && RefIdxSymL0  >  −1  &&<br>RefIdxSymL1 > −1 )<br>      sym_mvd_flag[ x0 ][ y0 ] | ae(v) |
|      if( inter_pred_idc[ x0 ][ y0 ] != PRED_L1 ) {<br>     if( NumRefIdxActive[ 0 ] > 1 && !sym_mvd_flag[ x0 ][ y0 ])<br>     ref_idx_l0[ x0 ][ y0 ] | ae(v) |
|      if(  NumRefIdxActive[ 0 ]   >   1   && !sym_mvd_flag[ x0 ][ y0 ]<br>&& !derive_ref_idx_flag )<br>      ref_idx_l0[ x0 ][ y0 ] | ae(v) |
|      mvd_coding( x0, y0, 0, 0 )<br>     if( MotionModelIdc[ x0 ][ y0 ] > 0 )<br>      mvd_coding( x0, y0, 0, 1 )<br>     if(MotionModelIdc[ x0 ][ y0 ] > 1 )<br>      mvd_coding( x0, y0, 0, 2 )<br>     mvp_l0_flag[ x0 ][ y0 ] | ae(v) |
|     } else {<br>     MvdL0[ x0 ][ y0 ][ 0 ] = 0<br>     MvdL0[ x0 ][ y0 ][ 1 ] = 0 | |
|     }<br>    if( inter_pred_idc[ x0 ][ y0 ] != PRED_L0 ) {<br>     if( NumRefIdxActive[ 1 ] > 1 && !sym_mvd_flag[ x0 ][ y0 ])<br>     ref_idx_l1[ x0 ][ y0 ] | ae(v) |
|      if(  NumRefIdxActive[ 1 ]   >   1<br>&& !sym_mvd_flag[ x0 ][ y0 ]&& !derive_ref_idx_flag )<br>      ref_idx_l1[ x0 ][ y0 ] | ae(v) |
|      if(  ph_mvd_l1_zero_flag   &&   inter_pred_idc[ x0 ][ y0 ]   = =<br>PRED_BI ) {<br>      MvdL1[ x0 ][ y0 ][ 0 ] = 0<br>      MvdL1[ x0 ][ y0 ][ 1 ] = 0<br>      MvdCpL1[ x0 ][ y0 ][ 0 ][ 0 ] = 0<br>      MvdCpL1[ x0 ][ y0 ][ 0 ][ 1 ] = 0<br>      MvdCpL1[ x0 ][ y0 ][ 1 ][ 0 ] = 0<br>      MvdCpL1[ x0 ][ y0 ][ 1 ][ 1 ] = 0<br>      MvdCpL1[ x0 ][ y0 ][ 2 ][ 0 ] = 0<br>      MvdCpL1[ x0 ][ y0 ][ 2 ][ 1 ] = 0<br>    } else { | |
|      ... | ... |
|     }<br>    mvp_l1_flag[ x0 ][ y0 ] | ae(v) |
|    } else { | |

TABLE 5-continued

| syntax element description of the disclosed reference index derivation | |
| --- | --- |
| | Descriptor |
| MvdL1[ x0 ][ y0 ][ 0 ] = 0<br>MvdL1[ x0 ][ y0 ][ 1 ] = 0<br>}<br>...<br>}<br>}<br>} | ... |

The italicized portions of the above table indicate that the portions are deleted.

FIG. 6B is a block diagram illustrating an exemplary decoder side derivation process 610 in accordance with some implementations of the present disclosure. In some implementations, decoder side derivation process 610 can be performed by prediction processing unit 81 of video decoder 30. In some implementations, decoder side derivation process 610 may be performed by a processor (e.g., a processor 1320 as shown in FIG. 13) at the decoder side. For illustration purpose only, the following description of FIG. 6B is provided with respect to the processor. In some implementations, decoder side derivation process 610 may include at least one of: (a) a syntax element analysis 612; or (b) a motion related parameter derivation 614 for determining one or more motion related parameters on the decoder side. In some examples, the one or more motion related parameters may include one or more MVDs and/or one or more reference indices for a video block from a video frame. Motion related parameter derivation 614 may include at least one of: (a) an MVD prediction 618 for deriving the one or more MVDs; or (b) a reference index derivation 620 for deriving the one or more reference indices.

With respect to syntax element analysis 612, the processor on the decoder side may receive one or more syntax elements for the video block from video encoder 20. The processor may determine whether one or more motion related parameters for the video block are signaled in a bitstream from video encoder 20 based on the one or more syntax elements. Responsive to determining that the one or more motion related parameters being signaled in the bitstream, the processor may obtain the one or more motion related parameters through the bitstream. Otherwise (e.g., responsive to determining that the one or more motion related parameters being not signaled in the bitstream), the processor may perform motion related parameter derivation 614 to determine the one or more motion related parameters using a coding matching technique. The coding matching technique can be a template matching technique or a bilateral matching technique, depending on whether the video block is coded with a uni-prediction scheme or a bi-prediction scheme.

For example, if a syntax element "mvd_derivation_flag" received from video encoder 20 is true, then one or more sets of d-MSBs for the one or more MVDs associated with the video block are not signaled in the bitstream. In this case, absolute values of the one or more MVDs (or, the one or more sets of d-MSBs) can be derived on the decoder side as described below in more detail. Otherwise (e.g., if the syntax element "mvd_derivation_flag" is false), the absolute values of the one or more MVDs (or, the one or more sets of d-MSBs) can be obtained through the bitstream.

In another example, if a syntax element "derive_ref_idx_flag" received from video encoder 20 is true, then one or more reference indices associated with the video block are not signaled in the bitstream. In this case, the one or more reference indices associated with the video block can be derived on the decoder side as described below in more detail. Otherwise (e.g., if the syntax element "derive_ref_idx_flag" is false), the one or more reference indices associated with the video block can be obtained through the bitstream.

An overview of motion related parameter derivation 614 is provided herein. Initially, the processor may determine a plurality of parameter candidates for the one or more motion related parameters based on syntax elements received through the bitstream. Each parameter candidate may include one or more values for the one or more motion related parameters, respectively. The processor may determine a plurality of matching costs associated with the plurality of parameter candidates, respectively. Then, the processor may derive the one or more motion related parameters based on a parameter candidate associated with a minimum matching cost among the plurality of matching costs.

Figure 8:
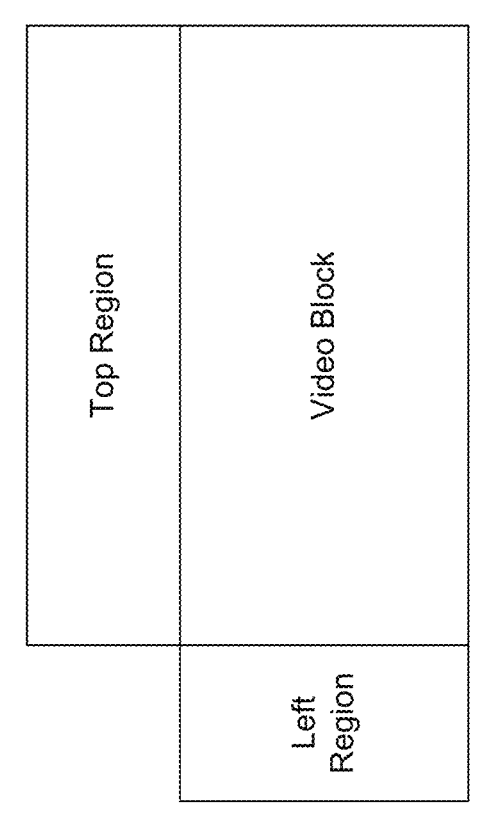
FIG. 8 is an illustration of an exemplary template for a video block coded using a uni-prediction scheme in accordance with some implementations of the present disclosure.

In some implementations, the video block is coded using the uni-prediction scheme, and correspondingly, the processor may apply the template matching technique to determine the one or more motion related parameters. Specifically, the processor may apply the template matching technique to determine the plurality of matching costs associated with the plurality of parameter candidates, respectively. For example, the processor may determine a template for the video block from the video frame. An exemplary template is illustrated in FIG. 8, which includes at least one of reconstructed samples located on a top region above the video block or reconstructed samples located on a left region of the video block. Then, for each parameter candidate from the plurality of parameter candidates, the processor may determine a reference region associated with the parameter candidate and determine a matching cost between the reference region and the template. As a result, the processor may determine a plurality of matching costs for the plurality of parameter candidates, respectively. The processor may derive the one or more motion related parameters based on a parameter candidate associated with the minimum matching cost among the plurality of matching costs.

For example, the one or more motion related parameters may include an MVD associated with the video block. An exemplary process to apply the template matching technique to determine the MVD is described below in more detail. In another example, the one or more motion related parameters may include a reference index associated with the video block. An exemplary process to apply the template matching technique to determine the reference index is described below in more detail.

In some other implementations, the video block is coded using the bi-prediction scheme, and correspondingly, the processor may apply the bilateral matching technique to determine the one or more motion related parameters. Specifically, the processor may apply the bilateral matching technique to determine the plurality of matching costs associated with the plurality of parameter candidates, respectively. For example, for each parameter candidate from the plurality of parameter candidates, the processor may derive one or more reference blocks associated with the parameter candidate and determine a matching cost for the parameter candidate based on the one or more reference blocks. As a result, the processor may determine a plurality of matching costs for the plurality of parameter candidates, respectively. The processor may derive the one or more motion related parameters based on a parameter candidate associated with the minimum matching cost among the plurality of matching costs.

For example, the one or more motion related parameters may include one or more MVDs associated with the video block. An exemplary process to apply the bilateral matching technique to determine the one or more MVDs is described below in more detail. In another example, the one or more motion related parameters may include one or more reference indices associated with the video block. An exemplary process to apply the bilateral matching technique to determine the one or more reference indices is described below in more detail.

It is noted that, in ECM, the template matching technique can be applied in the merge and AMVP candidate derivation. Therefore, MVD prediction 618 with the template matching technique is not enabled in these cases, and any existing coding method of the absolute value (abs_mvd_minus2) can still be applied. However, if the template matching technique is not enabled in the merge and AMVP candidate derivation, MVD prediction 618 with the template matching technique can be applied for the prediction of the MVD (e.g., for the prediction of a set of d-MSBs or an absolute value "abs_mvd_minus2" of the MVD).

In the following, MVD prediction 618 and reference index derivation 620 are described with respect to (a) a first exemplary case where the video block is coded using the uni-prediction scheme and (b) a second exemplary case where the video block is coded using the bi-prediction scheme. In the first exemplary case, the processor may perform MVD prediction 618 to determine an MVD for the video block using the template matching technique. To begin with MVD prediction 618, the processor may determine a template for the video block from the video frame, which may include at least one of reconstructed samples located on a top region above the video block or reconstructed samples located on a left region of the video block.

Next, the processor may determine a plurality of MVD candidates for the video block (e.g., each MVD candidate being considered as an example of a parameter candidate described above). In some implementations, each MVD candidate may include an absolute value candidate of the MVD. The processor may determine a plurality of absolute value candidates for the MVD as the plurality of MVD candidates for the video block, respectively. Specifically, the processor may obtain a syntax element "sh_derived_msb_length" (shown in Table 3 above) from the bitstream, where the syntax element "sh_derived_msb_length" is used to indicate a length of a set of d-MSBs associated with a bit plane of an absolute value of the MVD. The processor may determine a plurality of potential combinations for the set of d-MSBs based on the length of the set of d-MSBs. Then, the processor may determine the plurality of absolute value candidates for the MVD based on (a) a set of MSBs received from video encoder 20, (b) a set of LSBs received from video encoder 20, and (c) the plurality of potential combinations of the set of d-MSBs, respectively. The set of MSBs and the set of LSBs may be obtained based on a syntax element "reduced_abs_mvd_minus2," which indicates a reduced absolute value of the MVD and is received from video encoder 20.

Then, for each MVD candidate (e.g., each absolute value candidate of the MVD), the processor may determine a motion vector candidate for the video block based on the MVD candidate, a sign of the MVD candidate, and a motion vector predictor for the video block. For example, the sign of MVD candidate can be the same as the sign of the MVD, which can be received through the bitstream from video encoder 20. The motion vector predictor can be indicated by an AMVP index received through the bitstream from video encoder 20. The processor may generate a motion vector candidate for the video block as follows: the motion vector candidate=(the sign of the MVD) (the absolute value candidate of the MVD)+the motion vector predictor.

Subsequently, for each MVD candidate, the processor may determine a reference region associated with the MVD candidate based on the template, a reference index of a reference frame for the video block, and the motion vector candidate corresponding to the MVD candidate. For example, the reference region associated with the MVD candidate may have the same size as the template, and may include one or more reference blocks determined from the reference frame based on the motion vector candidate. In some implementations, the reference index used to identify the reference frame can be received through the bitstream from video encoder 20. In some other implementations, the reference index can be derived on the decoder side as described below in more detail.

Further, for each MVD candidate (e.g., each absolute value candidate of the MVD), the processor may determine a matching cost between the reference region corresponding to the MVD candidate and the template. For example, the matching cost can be a difference metric (e.g., a distance measurement) such as a Mean Square Error (MSE), an SAD, an SSD, etc., between the reference region and the template. As a result, a plurality of matching costs can be determined for the plurality of MVD candidates, respectively. For example, the processor may determine a plurality of matching costs for the plurality of absolute value candidates, respectively.

Then, the processor may derive the MVD for the video block based on an MVD candidate that is associated with the minimum matching cost among the plurality of matching costs. For example, the processor may derive the absolute value of the MVD to be an absolute value candidate of the MVD that is associated with the minimum matching cost among the plurality of matching costs. The processor may determine the MVD for the video block based on the derived absolute value of the MVD and the sign of the MVD received from video encoder 20. In some implementations, the processor may further generate a motion vector for the video block to be a sum of the MVD derived on the decoder side and the motion vector predictor indicated by the AMVP index received from video encoder 20.

For example, assuming that the set of MSBs and the set of LSBs received from video encoder 20 are (0000 . . . 0000)

and (1101), respectively, and the set of d-MSBs to be derived includes 4 bins. 16 potential combinations for the set of d-MSBs, which includes all the possible combinations of the 4 bins, can be obtained as follows: (0000), (0001), (0010), (0011), (0100), (0101), (0110), (0111), (1000), (1001), (1010), (1011), (1100), (1101), (1110), and (1111). Therefore, 16 absolute value candidates (e.g., 16 possible values of the absolute value "abs_mvd_minus2") can be obtained as follows: 13 (with a binarized form of 0000 . . . 0000, 0000, 1101), 29 (0000 . . . 0000, 0001, 1101), 45 (0000 . . . 0000, 0010, 1101), 61 (0000 . . . 0000, 0011, 1101), 77 (0000 . . . 0000, 0100, 1101), 93 (0000 . . . 0000, 0101, 1101), 109 (0000 . . . 0000, 0110, 1101), 125 (0000 . . . 0000, 0111, 1101), 141 (0000 . . . 0000, 1000, 1101), 157 (0000 . . . 0000, 1001, 1101), 173 (0000 . . . 0000, 1010, 1101), 189 (0000 . . . 0000, 1011, 1101), 205 (0000 . . . 0000, 1100, 1101), 221 (0000 . . . 0000, 1101, 1101), 237 (0000 . . . 0000, 1110, 1101), and 253 (0000 . . . 0000, 1111, 1101). Then, 16 motion vector candidates can be generated for the video block based on the 16 absolute value candidates, respectively, with each motion vector candidate corresponding to an absolute value candidate and calculated as follows: the motion vector candidate= (the sign of the MVD) (the corresponding absolute value candidate)+the motion vector predictor. For each motion vector candidate, a reference region of the template can be determined, and a distance between the reference region and the template can be calculated as a matching cost for the motion vector candidate. As a result, 16 matching costs can be obtained for the 16 motion vector candidates (also for the 16 absolute value candidates as well). An absolute value candidate with the smallest matching cost among the 16 matching costs can be selected as the absolute value for the MVD. That is, the set of d-MSBs can be determined from the absolute value candidate having the smallest matching cost. Then, the motion vector of the video block can be determined as follows: the motion vector of the video block=(the sign of the MVD) (the absolute value candidate with the minimal matching cost)+the motion vector predictor.

Also in the first exemplary case where the video block is coded using the uni-prediction scheme, the processor on the decoder side may perform reference index derivation 620 to determine a reference index for the video block using the template matching technique, so that the bits for signaling the reference index can be saved. It is contemplated that, given the same motion vector, different reference indices may indicate different reference regions for a template of the video block. Thus, a reference index which is associated with an optimal reference region (correspondingly, associated with a minimal matching cost) can be selected as the derived reference index for the video block.

To begin with reference index derivation 620, the processor may determine a template for the video block from the video frame, which may include at least one of reconstructed samples located on a top region above the video block or reconstructed samples located on a left region of the video block. Next, the processor may determine a plurality of reference index candidates for the video block (e.g., each reference index candidate being considered as an example of a parameter candidate described above). For example, video encoder 20 and video decoder 30 may jointly pre-determine all the potential reference indices for each video block, and the plurality of reference index candidates can include all the potential reference indices for the video block.

The processor may also determine a motion vector for the video block based on an MVD of the video block and a motion vector predictor for the video block. For example, the MVD of the video block can be received through the bitstream from video encoder 20. Alternatively, the MVD of the video block may be derived as described herein. The motion vector predictor can be indicated by an AMVP index received through the bitstream from video encoder 20. The processor may generate a motion vector for the video block as follows: the motion vector=the MVD+the motion vector predictor.

Given the motion vector and the template for the video block, the processor may determine a respective reference region corresponding to each reference index candidate. For example, for each reference index candidate, the processor may determine a reference region based on the template, the motion vector of the video block, and the reference index candidate. That is, the reference region associated with the reference index candidate may have the same size as the template. The reference region may include one or more reference blocks from a reference frame identified by the reference index candidate, with the one or more reference blocks being determined based on the motion vector of the video block.

Further, for each reference index candidate, the processor may determine a matching cost between the reference region and the template. For example, the matching cost can be a difference metric such as an MSE, an SAD, an SSD, etc., between the reference region and the template. As a result, a plurality of matching costs can be determined for the plurality of reference index candidates, respectively. Subsequently, the processor may derive the reference index for the video block to be a reference index candidate that is associated with the minimum matching cost among the plurality of matching costs.

For example, assuming that there are N reference index candidates, including $r_0$, $r_1$, . . . , $r_{N-1}$. Based on the motion vector and the template of the video block, a total of N reference regions of the template can be obtained for the N reference index candidates, respectively. A reference region which has the smallest matching cost (e.g., the smallest distance to the template) can be selected as an optimal reference region. A reference index candidate corresponding to the optimal reference region (also corresponding to the smallest matching cost) can be selected to be the reference index for the video block.

In the second exemplary case where the video block is coded using the bi-prediction scheme, the processor may perform MVD prediction 618 to determine one or more MVDs for the video block using the bilateral matching technique. It is contemplated that bilateral matching may include a process of determining motion vectors that result in the minimum difference between two matched reference blocks in two directions. This second exemplary case with respect to MVD prediction 618 is described below in a first exemplary sub-case and a second exemplary sub-case, respectively.

In the first exemplary sub-case of MVD prediction 618 under the bi-prediction scheme, the one or more MVDs to be derived on the decoder side may include a first MVD of a first motion vector to be derived on the decoder side for a first direction, whereas a second MVD of a second motion vector for a second direction may be signaled from video encoder 20 to video decoder 30. The first MVD can be associated with a first reference frame list, and the second MVD can be associated with a second reference frame list. The first reference frame list can be List 0, and the second reference frame list can be List 1. Alternatively, the first reference frame list can be List 1, and the second reference frame list can be List 0.

For example, assuming that the first MVD of List 0 needs to be predicted on the decoder side, whereas the second MVD (e.g., an absolute value "abs_mvd_minus2" of the second MVD) of List 1 can be coded with EG code and received from video encoder 20. Then, a first set of d-MSBs from an absolute value ("abs_mvd_minus2") of the first MVD can be derived on the decoder side. All the potential values for the first set of d-MSBs can be checked with the bilateral matching technique, and a potential value of the first set of d-MSBs which leads to the minimum matching cost can be selected for the derivation of the first MVD on the decoder side.

Detailed operations for the first exemplary sub-case are described herein. Initially, the processor may determine a plurality of first MVD candidates for the first MVD (e.g., each first MVD candidate being considered as an example of a parameter candidate described above). For example, each first MVD candidate may include an absolute value candidate of the first MVD. The processor may determine a plurality of absolute value candidates for the first MVD as the plurality of first MVD candidates for the video block, respectively, by performing operations like those described above.

Then, for each first MVD candidate (e.g., each absolute value candidate of the first MVD), the processor may determine a first motion vector candidate for the video block based on the first MVD candidate, a sign of the first MVD candidate, and a first motion vector predictor for the video block. For example, the sign of the first MVD candidate can be the same as the sign of the first MVD, which can be received through the bitstream from video encoder 20. The first motion vector predictor can be indicated by a first AMVP index received through the bitstream from video encoder 20. The processor may generate a first motion vector candidate for the video block as follows: the first motion vector candidate=(the sign of the first MVD) (the absolute value candidate of the first MVD)+the first motion vector predictor.

Next, for each first MVD candidate, the processor may derive a first reference block based on the first motion vector candidate. For example, the processor may determine the first reference block from a first reference frame based on (a) the first motion vector candidate for the video block and (b) a first reference index used to identify the first reference frame in the first reference frame list. In some examples, the first reference index can be received from video encoder 20. In some other examples, the first reference index can be derived as disclosed herein. Additionally, the processor may derive a second reference block from a second reference frame based on (a) a second motion vector for the video block and (b) a second reference index which is used to identify the second reference frame in the second reference frame list. The second motion vector can be determined based on the second MVD of the video block and a second motion vector predictor which are signaled from video encoder 20. In some examples, the second reference index can be received from video encoder 20. In some other examples, the second reference index can be derived as disclosed herein.

Further, for each first MVD candidate (e.g., each absolute value candidate of the first MVD), the processor may determine a matching cost based on the first reference block and the second reference block. For example, the matching cost can be a distance metric such as an MSE, an SAD, an SSD, etc., between the first and second reference blocks. As a result, a plurality of matching costs can be determined for the plurality of first MVD candidates, respectively. For example, a plurality of matching costs can be determined for the plurality of absolute value candidates of the first MVD by performing operations like those described above.

Subsequently, the processor may derive the first MVD for the video block based on a first MVD candidate associated with the minimum matching cost among the plurality of matching costs. For example, the processor may derive an absolute value of the first MVD to be an absolute value candidate of the first MVD that is associated with the minimum matching cost among the plurality of matching costs. The processor may determine the first MVD for the video block based on the absolute value of the first MVD and a sign of the first MVD received from video encoder 20.

In some implementations, the processor may further generate the first motion vector for the video block to be a sum of the first MVD derived on the decoder side and the first motion vector predictor indicated by the first AMVP index received from video encoder 20. For example, the first motion vector for the video block=the first MVD derived on the decoder side+the first motion vector predictor.

In the second exemplary sub-case of MVD prediction 618 under the bi-prediction scheme, the one or more MVDs to be derived on the decoder side may include a pair of MVDs, including (a) the first MVD for the first motion vector associated with the first reference frame list and (b) the second MVD for the second motion vector associated with the second reference frame list. That is, both the first MVD and the second MVD can be derived on the decoder side (e.g., the first and second MVDs can be predicted jointly on the decoder side). For example, both the first set of d-MSBs for the absolute value of the first MVD (denoted as d-MSBs_1) and a second set of d-MSBs for the absolute value of the second MVD (denoted as d-MSBs_2) can be derived jointly on the decoder side. All the potential values for the pair of the first set of d-MSBs and the second set of d-MSBs (d-MSBs_1, d-MSBs_2) can be checked with the bilateral matching technique, and a potential value for the pair (d-MSBs_1, d-MSBs_2) which leads to the minimum matching cost can be selected for the derivation of the first MVD and the second MVD on the decoder side. Detailed operations for the second exemplary sub-case are described herein. Initially, the processor may determine a plurality of pairs of first MVD candidates for the first MVD and second MVD candidates for the second MVD. Specifically, by performing operations like those described above, the processor may determine a plurality of first MVD candidates for the first MVD, respectively. The processor may also determine a plurality of second MVD candidates for the second MVD, respectively. The processor may determine a plurality of pairs of the first MVD candidates and the second MVD candidates, with each pair including a first MVD candidate and a second MVD candidate and being considered as an example of a parameter candidate described above.

For example, each first MVD candidate may include an absolute value candidate of the first MVD, and each second MVD candidate may include an absolute value candidate of the second MVD. By performing operations like those described above, the processor may determine a plurality of absolute value candidates for the first MVD and a plurality of absolute value candidates for the second MVD, respectively. The processor may determine a plurality of pairs of absolute value candidates of the first MVD and the second MVD, with each pair including an absolute value candidate of the first MVD and an absolute value candidate of the second MVD. In a further example, a first set of d-MSBs to be derived for the first MVD (d-MSBs_1) may include N1 bins, and a second set of d-MSBs to be derived for the second MVD (d-MSBs_2) may include N2 bins, where N1 and N2 are positive integers. Then, the plurality of pairs of absolute value candidates of the first MVD and the second MVD may include N1*N2 pairs, with each pair (e.g., a joint pair of d-MSBs (d-MSBs_1, d-MSBs_2)) including a first potential value for the first set of d-MSBs and a second potential value for the second set of d-MSBs.

Then, for each pair of the first MVD candidates and the second MVD candidates (e.g., each pair of the absolute value candidates of the first MVD and the second MVD), the processor may determine a first motion vector candidate for the video block based on the first MVD candidate in the pair, a sign of the first MVD candidate in the pair, and a first motion vector predictor for the video block. For example, the sign of the first MVD candidate can be the same as the sign of the first MVD, which can be received through the bitstream from video encoder 20. The first motion vector predictor can be indicated by a first AMVP index received through the bitstream from video encoder 20. The processor may generate the first motion vector candidate for the video block as follows: the first motion vector candidate=(the sign of the first MVD) (the absolute value candidate of the first MVD)+the first motion vector predictor. Also, the processor may determine a second motion vector candidate for the video block based on the second MVD candidate in the pair, a sign of the second MVD candidate in the pair, and a second motion vector predictor for the video block. For example, the sign of the second MVD candidate can be the same as the sign of the second MVD, which can be received through the bitstream from video encoder 20. The second motion vector predictor can be indicated by a second AMVP index received through the bitstream from video encoder 20. The processor may generate the second motion vector candidate for the video block as follows: the second motion vector candidate=(the sign of the second MVD) (the absolute value candidate of the second MVD)+the second motion vector predictor.

Next, for each pair of the first MVD candidates and the second MVD candidates, the processor may derive the first reference block and the second reference block associated with the first MVD candidate and the second MVD candidate in the pair, respectively. For example, the processor may determine the first reference block from a first reference frame based on (a) the first motion vector candidate determined based on the first MVD candidate and (b) a first reference index used to identify the first reference frame in the first reference frame list. The processor may also determine the second reference block from a second reference frame based on (a) the second motion vector candidate determined based on the second MVD candidate and (b) a second reference index used to identify the second reference frame in the second reference frame list. In some examples, the first and second reference indices can be received from video encoder 20. In some other examples, the first and second reference indices can be derived as disclosed herein.

Further, for each pair of the first MVD candidates and the second MVD candidates (e.g., each pair of the absolute value candidates of the first MVD and the second MVD), the processor may determine a matching cost based on the first reference block and the second reference block. For example, the matching cost can be a distance metric such as an MSE, an SAD, an SSD, etc., between the first and second reference blocks. As a result, a plurality of matching costs can be determined for the plurality of pairs of the first MVD candidates and the second MVD candidates, respectively. For example, a plurality of matching costs can be determined for the plurality of pairs of absolute value candidates of the first MVD and the second MVD, respectively.

Subsequently, the processor may derive the first MVD and the second MVD for the video block based on a pair of the first MVD candidates and the second MVD candidates that is associated with the minimum matching cost among the plurality of matching costs. For example, the processor may derive an absolute value of the first MVD and an absolute value of the second MVD based on a corresponding pair of absolute value candidates of the first MVD and the second MVD that is associated with the minimum matching cost. The processor may determine the first MVD for the video block based on the absolute value of the first MVD derived on the decoder side and the sign of the first MVD received from video encoder 20. The processor may also determine the second MVD for the video block based on the absolute value of the second MVD derived on the decoder side and the sign of the second MVD received from video encoder 20.

In some implementations, the processor may further generate the first motion vector for the video block to be a sum of the first MVD derived on the decoder side and the first motion vector predictor indicated by the first AMVP index received from video encoder 20. The processor may also generate the second motion vector for the video block to be a sum of the second MVD derived on the decoder side and the second motion vector predictor indicated by the second AMVP index received from video encoder 20.

Additionally or alternatively, in the second exemplary case where the video block is coded using the bi-prediction scheme, the processor on the decoder side may perform reference index derivation 620 to determine one or more reference indices for the video block using the bilateral matching technique. The second exemplary case with respect to reference index derivation 620 is also described below in a first exemplary sub-case and a second exemplary sub-case, respectively.

In the first exemplary sub-case of reference index derivation 620 under the bi-prediction scheme, the one or more reference indices to be derived on the decoder side may include a first reference index used to identify a first reference frame in the first reference frame list, whereas a second reference index used to identify a second reference frame in the second reference frame list can be signaled from video encoder 20. If symmetric MVD is used, a reference index of List 0 can be treated as the first reference index to be derived on the decoder side. In some implementations, the reference index of List 0 can be set as a default reference index to be derived. Alternatively, it can be indicated at an SPS or a slice header whether the reference index of List 0 or a reference index of List 1 is to be derived on the decoder side. Once the reference index to be derived on the decoder side is determined, it would not be signaled from video encoder 20 to video decoder 30.

For example, assuming that the first reference index to be predicted on the decoder side is the reference index of List 0, whereas the second reference index which is the reference index of List 1 can be signaled to video decoder 30. For each potential value of the first reference index, a first reference block can be obtained based on a first motion vector of the video block and the potential value of the first reference index. A second reference block can be obtained based on a second motion vector of the video block and the second reference index. A distance between the first and second reference blocks can be used as a matching cost for the potential value of the first reference index. As a result, a plurality of matching costs can be determined for a plurality of potential values for the first reference index, respectively. A potential value of the first reference index which leads to the minimum matching cost can be selected as a derived value for the first reference index on the decoder side.

Detailed operations for the first exemplary sub-case are described herein. Initially, the processor may determine a plurality of reference index candidates for the first reference index (e.g., each reference index candidate being considered as an example of a parameter candidate described above). For example, video encoder 20 and video decoder 30 may jointly pre-determine all the potential values for the first reference index for each video block, and the plurality of reference index candidates for the first reference index can include all the pre-determined potential values of the first reference index.

Next, the processor may determine a first motion vector for the video block based on a first MVD of the video block and a first motion vector predictor for the video block. For example, the first MVD of the video block can be received through the bitstream from video encoder 20. Alternatively, the first MVD of the video block may be derived as described herein. The first motion vector predictor can be indicated by a first AMVP index received through the bitstream from video encoder 20. The processor may generate the first motion vector for the video block as follows: the first motion vector=the first MVD+the first motion vector predictor. Similarly, the processor may determine a second motion vector for the video block based on a second MVD of the video block and a second motion vector predictor for the video block. For example, the second MVD of the video block can be received through the bitstream from video encoder 20. Alternatively, the second MVD of the video block may be derived as described herein. The second motion vector predictor can be indicated by a second AMVP index received through the bitstream from video encoder 20. The processor may generate the second motion vector for the video block as follows: the second motion vector=the second MVD+the second motion vector predictor.

Then, for each reference index candidate of the first reference index, the processor may derive a first reference block based on the first motion vector. For example, the processor may determine the first reference block from a first reference frame based on (a) the first motion vector for the video block and (b) the reference index candidate of the first reference index, where the reference index candidate of the first reference index can be used to identify the first reference frame in the first reference frame list. Additionally, the processor may derive a second reference block from a second reference frame based on (a) the second motion vector for the video block and (b) a second reference index which is used to identify the second reference frame in the second reference frame list. In this case, the second reference index of the video block can be signaled from video encoder 20.

Further, for each reference index candidate of the first reference index, the processor may determine a matching cost between the first and second reference blocks. For example, the matching cost can be a difference metric such as an MSE, an SAD, an SSD, etc., between the first and second reference blocks. As a result, a plurality of matching costs can be determined for the plurality of reference index candidates of the first reference index, respectively. Then, the processor may derive the first reference index for the video block to be a reference index candidate of the first reference index that is associated with the minimum matching cost among the plurality of matching costs.

In the second exemplary sub-case of reference index derivation 620 under the bi-prediction scheme, the one or more reference indices to be derived on the decoder side may include both the first reference index and the second reference index. In this case, both the first reference index and the second reference index can be derived on the decoder side (e.g., not signaled from video encoder 20). That is, the first reference index and the second reference index may be predicted jointly on the decoder side.

For example, for each pair of potential values of the first reference index and the second reference index, a first reference block can be obtained based on (a) a first motion vector of the video block and (b) a potential value of the first reference index included in the pair; a second reference block can be obtained based on (a) a second motion vector of the video block and (b) a potential value of the second reference index included in the pair; and a distance between the first and second reference blocks can be used as a matching cost for the pair of potential values of the first reference index and the second reference index. As a result, a plurality of matching costs can be determined for a plurality of pairs of potential values of the first reference index and the second reference index, respectively. A pair of potential values of the first reference index and the second reference index which leads to the minimum matching cost can be selected as a derived value for the first reference index and a derived value for the second reference index on the decoder side, respectively.

Detailed operations for the second exemplary sub-case are described herein. Initially, the processor may determine a plurality of pairs of reference index candidates for the first reference index and the second reference index (e.g., each pair of reference index candidates being considered as an example of a parameter candidate described above). For example, video encoder 20 and video decoder 30 may jointly pre-determine M1 potential values for the first reference index and M2 potential values for the second reference index for each video block, where M1 and M2 are positive integers. Then, the plurality of pairs of reference index candidates for the first reference index and the second reference index can include M1*M2 pairs of potential values for the first reference index and the second reference index.

Next, by performing operations like those described above for the first exemplary sub-case of reference index derivation 620 under the bi-prediction scheme, the processor may determine a first motion vector for the video block based on a first MVD of the video block and a first motion vector predictor for the video block. The processor may also determine a second motion vector for the video block based on a second MVD of the video block and a second motion vector predictor for the video block.

Then, for each pair of reference index candidates of the first reference index and the second reference index, the processor may derive a first reference block and a second reference block based on the corresponding pair of reference index candidates. For example, the processor may determine the first reference block from a first reference frame based on (a) the first motion vector for the video block and (b) the reference index candidate of the first reference index included in the pair. The reference index candidate of the first reference index can be used to identify the first reference frame in the first reference frame list. The processor may also determine the second reference block from a second reference frame based on (a) the second motion vector for the video block and (b) the reference index candidate of the second reference index included in the pair.

The reference index candidate of the second reference index can be used to identify the second reference frame in the second reference frame list.

Further, for each pair of reference index candidates of the first reference index and the second reference index, the processor may determine a matching cost between the first and second reference blocks. For example, the matching cost can be a difference metric between the first and second reference blocks. As a result, a plurality of matching costs can be determined for the plurality of pairs of reference index candidates of the first reference index and the second reference index, respectively.

Subsequently, the processor may derive the first reference index and the second reference index for the video block based on a pair of reference index candidates of the first reference index and the second reference index that is associated with the minimum matching cost among the plurality of matching costs. For example, the processor may derive the first reference index to be a reference index candidate of the first reference index which is included in the pair associated with the minimum matching cost. The processor may derive the second reference index to be a reference index candidate of the second reference index which is included in the pair associated with the minimum matching cost.

Consistent with some implementations of the present disclosure, MVD prediction 618 and reference index derivation 620 can be performed jointly on the decoder side. Taking the video block being coded using the uni-prediction scheme as an example, the one or more motion related parameters to be derived on the decoder side may include an MVD of the video block and a reference index used to identify a reference frame for the video block. In this case, the prediction of the MVD and the reference index can be performed jointly on the decoder side using the template matching technique.

To begin with, the processor may firstly determine a plurality of pairs of MVD candidates and reference index candidates for the video block, with each pair including an MVD candidate and a reference index candidate. For example, the processor may determine that there may be N MVD candidates and M reference index candidates for the video block, so that the plurality of pairs of MVD candidates and reference index candidates for the video block can be N*M pairs. N and M are positive integers.

Next, for each pair of MVD candidates and reference index candidates, the processor may determine a reference region associated with the pair. For example, the processor may determine a motion vector candidate for the video block based on the MVD candidate included in the pair and a motion vector predictor indicated by an AMVP index. The processor may determine a reference region based on the template, the reference index candidate included in the pair, and the motion vector candidate for the video block.

Further, for each pair of MVD candidates and reference index candidates, the processor may determine a matching cost between the template of the video block and the reference region corresponding to the pair. For example, the matching cost can be a difference metric (e.g., a distance measurement) between the reference region and the template. As a result, a plurality of matching costs can be determined for the plurality of pairs of MVD candidates and reference index candidates, respectively.

Subsequently, the processor may derive the MVD and the reference index for the video block based on a pair of MVD candidates and reference index candidates that is associated with the minimum matching cost among the plurality of matching costs. For example, the processor may derive the MVD to be a MVD candidate included in the pair that is associated with the minimum matching cost. The processor may also derive the reference index to be a reference index candidate included in the pair that is associated with the minimum matching cost.

It is contemplated that when the video block is coded using the bi-prediction scheme, similar operations may be performed for predicting or deriving the MVD and the reference index jointly on the decoder side using the bilateral matching technique. The similar descriptions will not be repeated herein.

FIG. 7 is an illustration of an exemplary bit plane for an absolute value of an MVD in accordance with some implementations of the present disclosure. FIG. 8 is an illustration of an exemplary template for a video block coded using a uni-prediction scheme in accordance with some implementations of the present disclosure. FIGS. 7-8 are described above with reference to FIGS. 6A-6B, and the similar description will not be repeated herein.

FIG. 9 is a flow chart of an exemplary method 900 for motion information derivation in accordance with some implementations of the present disclosure. Method 900 may be implemented by a processor associated with video decoder 30, and may include steps 902-904 as described below. Some of the steps may be optional to perform the disclosure provided herein. Further, some of the steps may be performed simultaneously, or in a different order than shown in FIG. 9.

In step 902, the processor may determine that one or more motion related parameters for a video block in a video frame of a video are not signaled in a bitstream from a video encoder. For example, the processor may determine that the one or more motion related parameters are to be derived on the decoder side based on one or more syntax elements received from the video encoder. In some implementations, the one or more motion related parameters may include at least one of an MVD of the video block or a reference index for the video block.

In step 904, the processor may determine the one or more motion related parameters for the video block by applying a coding matching technique. The coding matching technique is a template matching technique or a bilateral matching technique. An exemplary implementation of step 904 is described below in more detail with reference to FIG. 10.

Figure 10:
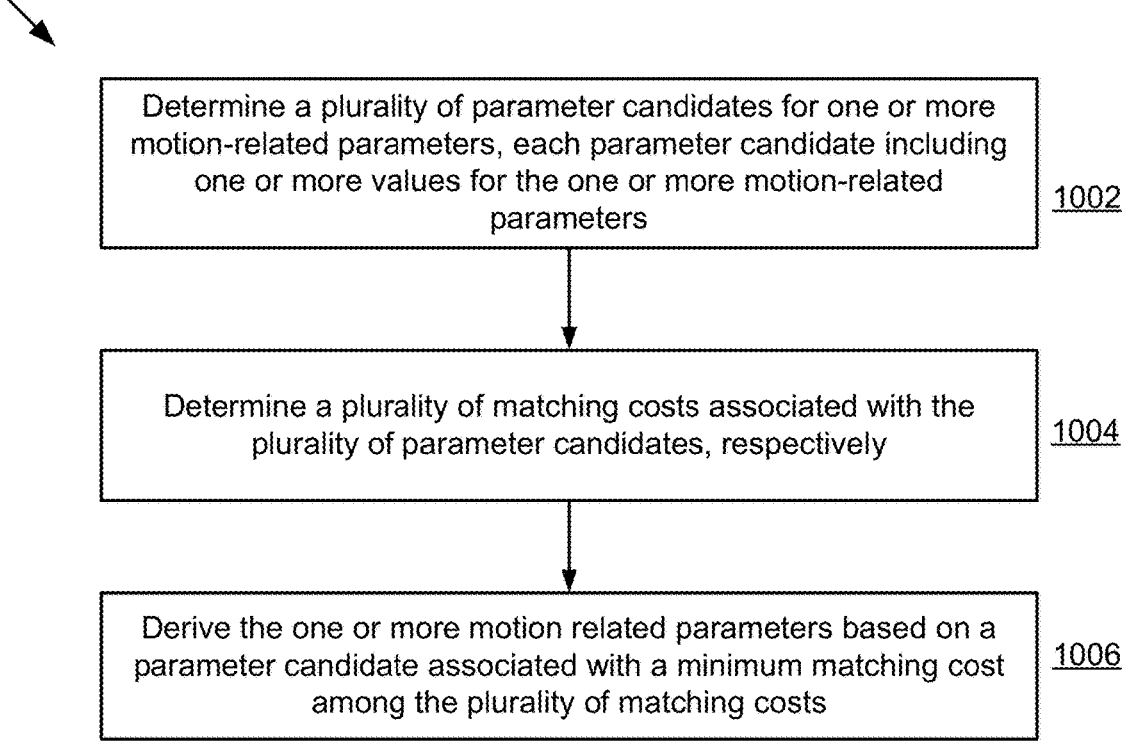
FIG. 10 is a flow chart of an exemplary method for determining one or more motion related parameters for a video block by applying a coding matching technique in accordance with some implementations of the present disclosure.

FIG. 10 is a flow chart of an exemplary method 1000 for determining one or more motion related parameters for a video block by applying a coding matching technique in accordance with some implementations of the present disclosure. Method 1000 may be implemented by a processor associated with video decoder 30, and may include steps 1002-1006 as described below. Some of the steps may be optional to perform the disclosure provided herein. Further, some of the steps may be performed simultaneously, or in a different order than shown in FIG. 10.

In step 1002, the processor may determine a plurality of parameter candidates for the one or more motion related parameters. Each parameter candidate may include one or more values for the one or more motion related parameters, respectively.

In step 1004, the processor may determine a plurality of matching costs associated with the plurality of parameter candidates, respectively. An exemplary implementation of step 1004 is described below in more detail with reference to FIG. 11.

In step 1006, the processor may derive the one or more motion related parameters based on a parameter candidate associated with a minimum matching cost among the plurality of matching costs.

Figure 11:
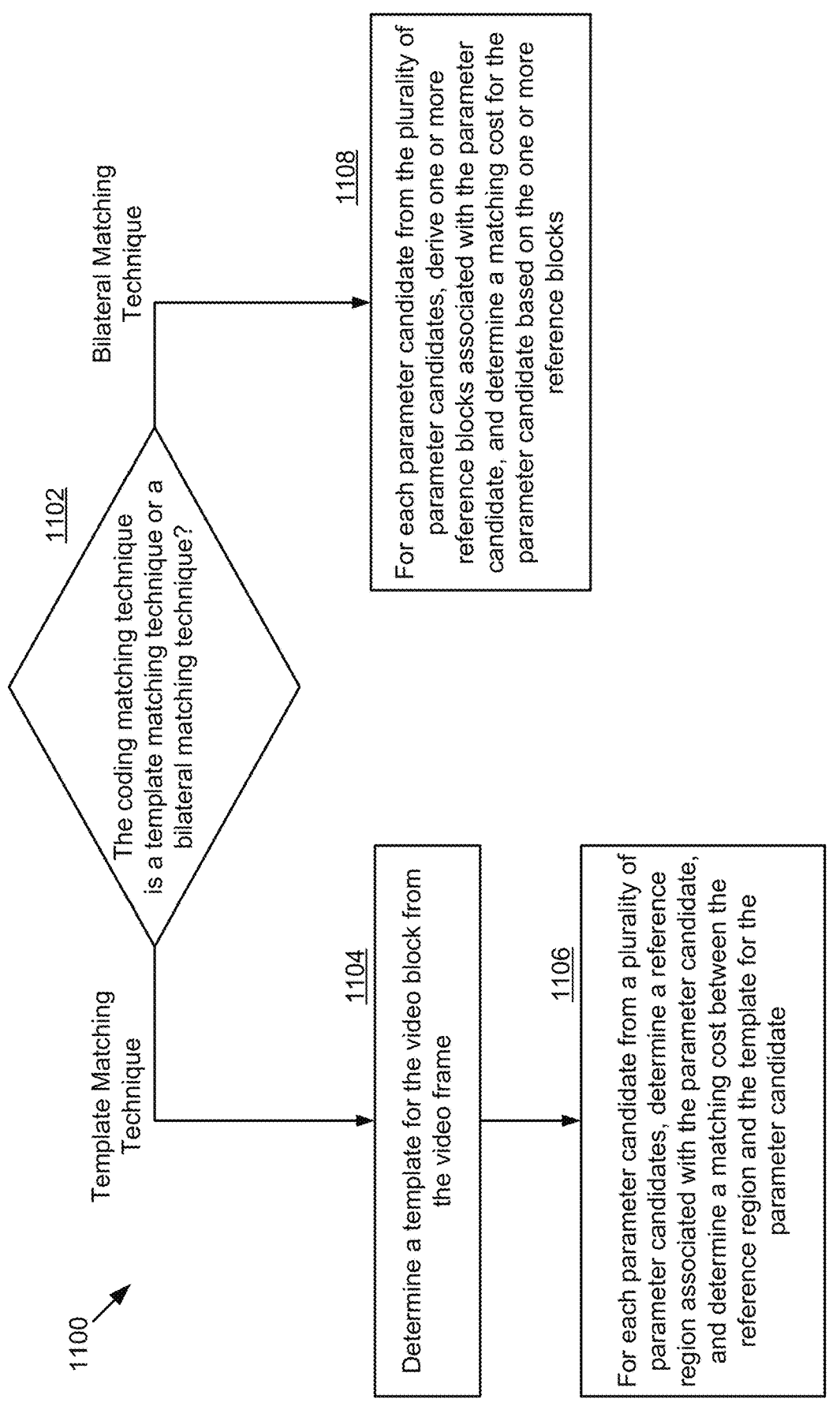
FIG. 11 is a flow chart of an exemplary method for determining a plurality of matching costs associated with a plurality of parameter candidates, respectively, in accordance with some implementations of the present disclosure.

FIG. 11 is a flow chart of an exemplary method 1100 for determining a plurality of matching costs associated with a plurality of parameter candidates, respectively, in accordance with some implementations of the present disclosure. Method 1100 may be implemented by a processor associated with video decoder 30, and may include steps 1102-1108 as described below. Some of the steps may be optional to perform the disclosure provided herein. Further, some of the steps may be performed simultaneously, or in a different order than shown in FIG. 11.

In step 1102, the processor may determine whether a coding matching technique applied to derive one or more motion related parameters on the decoder side is a template matching technique or a bilateral matching technique. Responsive to the template matching technique being applied, method 1100 may proceed to step 1104. Responsive to the bilateral matching technique being applied, method 1100 may proceed to step 1108. For example, if a video block of a video frame is coded using a uni-prediction scheme, the template matching technique is applied. If the video block is coded using a bi-prediction scheme, the bilateral matching technique is applied.

In step 1104, the processor may determine a template for the video block from the video frame.

In step 1106, for each parameter candidate from the plurality of parameter candidates, the processor may determine a reference region associated with the parameter candidate and determine a matching cost between the reference region and the template for the parameter candidate. As a result, a plurality of matching costs can be determined for the plurality of parameter candidates, respectively.

In step 1108, for each parameter candidate from the plurality of parameter candidates, the processor may derive one or more reference blocks associated with the parameter candidate and determine a matching cost for the parameter candidate based on the one or more reference blocks.

FIG. 12 is a flow chart of an exemplary method 1200 for encoding motion information in accordance with some implementations of the present disclosure. Method 1200 may be implemented by a processor associated with video encoder 20, and may include steps 1202-1208 as described below. Some of the steps may be optional to perform the disclosure provided herein. Further, some of the steps may be performed simultaneously, or in a different order than shown in FIG. 12.

In step 1202, the processor may receive a video block in a video frame of a video.

In step 1204, the processor may determine not to signal one or more motion related parameters for the video block in a bitstream to a video decoder.

In step 1206, the processor may generate at least one syntax element to indicate that the one or more motion related parameters for the video block are to be predicted by the video decoder.

In step 1208, the processor may include the at least one syntax element in the bitstream for the video decoder to independently determine the one or more motion parameters.

Consistent with some implementations of the present disclosure, the one or more motion related parameters may include one or more MVDs for the video block. For each of the one or more MVDs, the processor may encode the MVD using a binarization and splitting method. The binarization and splitting method may include absolute value binarization 604 and bit plane splitting 606 described above with reference to FIG. 6A. For example, by performing operations like those described above with reference to FIG. 6A, the processor may binarize an absolute value of the MVD into a bit plane, and divide the bit plane into a set of MSBs, a set of d-MSBs, and a set of LSBs. The processor may generate a reduced absolute value for the MVD using the set of MSBs and the set of LSBs.

For each of the one or more MVDs, the processor may also generate a set of syntax elements based on the encoding of the MVD. The bitstream may include the set of syntax elements. For example, the processor may generate a first syntax element (e.g., "mvd_derivation_flag" in Table 4 above) for indicating whether MVD prediction 618 is to be applied on video decoder 30. The processor may also generate a second syntax element (e.g., "reduced_abs_mvd_minus2" in Table 4 above) for signaling the reduced absolute value of the MVD to video decoder 30. The processor may also generate a third syntax element (e.g., "sh_derived_msb_length" in Table 3 above) for signaling a length of the set of d-MSBs to video decoder 30. The processor may also generate a fourth syntax element (e.g., "sh_derived_msb_pos" in Table 3 above) for signaling a position where the set of d-MSBs starts in the bit plane to video decoder 30. The processor may include the first, second, third, and fourth syntax elements into the bitstream.

In some implementations, the video block is coded using a uni-prediction scheme by the video encoder, and then the one or more MVDs may include an MVD only. The processor may perform operations like those described herein to encode the MVD and to generate the bitstream based on the encoding of the MVD.

In some other implementations, the video block is coded using a bi-prediction scheme by the video encoder, and then the one or more MVDs may include a first MVD and a second MVD. If both the first and second MVDs are not signaled to video decoder 30 (e.g., both the first and second MVDs are to be derived on video decoder 30), the processor may perform operations like those described herein to (a) encode the first MVD to generate a first set of syntax elements and to (b) encode the second MVD to generate a second set of syntax elements, respectively. The processor may include the first set of syntax elements and the second set of syntax elements into the bitstream. In this case, the first and second MVDs can be jointly predicted on the decoder side. Alternatively, if only one of the first and second MVDs is not signaled to video decoder 30 (e.g., only one of the first and second MVDs is to be derived on video decoder 30), the processor may perform operations like those described herein to encode the one of the first and second MVDs to generate a set of syntax elements. The processor may include the set of syntax elements into the bitstream, so that the one of the first and second MVDs is predicted on the decoder side. In this case, the other one of the first and second MVDs can be signaled to video decoder 30, rather than being derived on the decoder side using MVD prediction 618.

Consistent with some implementations of the present disclosure, the one or more motion related parameters may include one or more reference indices for the video block. The processor may generate a syntax element (e.g., "derive_ref_idx_flag" in Table 5 above) for indicating whether reference index derivation 620 is to be applied on video decoder 30. The processor may include the syntax element ("derive_ref_idx_flag") into the bitstream.

In some implementations, the video block is coded using a uni-prediction scheme, and then the one or more reference indices may include a reference index only. The processor may perform operations like those described herein to generate and include the syntax element (e.g., "derive_ref_idx_flag") for the reference index into the bitstream.

In some other implementations, the video block is coded using a bi-prediction scheme, and then the one or more reference indices may include a first reference index and a second reference index. In a first scenario, both the first and second reference indices are not signaled to video decoder 30 (e.g., both the first and second reference indices are to be derived on video decoder 30). In a second scenario, only one of the first and second reference indices is not signaled to video decoder 30 (e.g., only one of the first and second reference indices is to be derived on video decoder 30). In either scenario, the processor may perform operations like those described herein to generate and include the syntax element ("derive_ref_idx_flag") into the bitstream.

FIG. 13 shows a computing environment 1310 coupled with a user interface 1350, according to some implementations of the present disclosure. The computing environment 1310 can be part of a data processing server. Consistent with the present disclosure, video encoder 20 and video decoder 30 can be implemented using the computing environment 1310. The computing environment 1310 includes a processor 1320, a memory 1330, and an Input/Output (I/O) interface 1340.

The processor 1320 typically controls overall operations of the computing environment 1310, such as the operations associated with display, data acquisition, data communications, and image processing. The processor 1320 may include one or more processors to execute instructions to perform all or some of the steps in the above-described methods. Moreover, the processor 1320 may include one or more modules that facilitate the interaction between the processor 1320 and other components. The processor 1320 may be a Central Processing Unit (CPU), a microprocessor, a single chip machine, a Graphical Processing Unit (GPU), or the like.

The memory 1330 is configured to store various types of data to support the operation of the computing environment 1310. The memory 1330 may include predetermined software 1332. Examples of such data includes instructions for any applications or methods operated on the computing environment 1310, video datasets, image data, etc. The memory 1330 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1340 provides an interface between the processor 1320 and peripheral interface modules, such as a keyboard, a click wheel, buttons, or the like. The buttons may include but are not limited to, a home button, a start scan button, and a stop scan button. The I/O interface 1340 can be coupled with an encoder and decoder.

In some implementations, there is also provided a non-transitory computer-readable storage medium including a plurality of programs, for example, in the memory 1330, executable by the processor 1320 in the computing environment 1310, for performing the above-described methods. Alternatively, the non-transitory computer-readable storage medium may have stored therein a bitstream or a data stream including encoded video information (for example, video information including one or more syntax elements) generated by an encoder (for example, video encoder 20 in FIG. 2) using, for example, the encoding method described above for use by a decoder (for example, video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In some implementations, there is also provided a computing device including one or more processors (for example, the processor 1320); and the non-transitory computer-readable storage medium or the memory 1330 having stored therein a plurality of programs executable by the one or more processors, wherein the one or more processors, upon execution of the plurality of programs, are configured to perform the above-described methods.

In some implementations, there is also provided a computer program product including a plurality of programs, for example, in the memory 1330, executable by the processor 1320 in the computing environment 1310, for performing the above-described methods. For example, the computer program product may include the non-transitory computer-readable storage medium.

In some implementations, the computing environment 1310 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A video processing method for motion information derivation, comprising:

determining, by a video decoder, that one or more motion related parameters for a video block in a video frame are not signaled in a bitstream; and determining, by the video decoder, the one or more motion related parameters that comprise one or more motion vector differences (MVDs) for the video block by applying a coding matching technique, wherein the coding matching technique is a template matching technique or a bilateral matching technique, wherein determining the one or more motion related parameters comprises:

determining a plurality of parameter candidates for the one or more motion related parameters, each parameter candidate comprising one or more values for the one or more motion related parameters, respectively;

determining a plurality of matching costs associated with the plurality of parameter candidates, respectively; and deriving the one or more motion related parameters based on a parameter candidate associated with a minimum matching cost among the plurality of matching costs, wherein determining the plurality of parameter candidates for the one or more motion related parameters comprises determining a plurality of MVD candidates, and wherein determining the plurality of MVD candidates comprises:

determining a plurality of potential combinations for a set of derived most significant bins (d-MSBs) from a bit plane of an absolute value of a MVD of the one or more MVDs based on a length of the set of d-MSBs, wherein the absolute value of the MVD is binarized into the bit plane which comprises a set of most significant bins (MSBs), the set of d-MSBs, and a set of least significant bins (LSBs); and determining a plurality of absolute value candidates for the MVD based on the set of MSBs, the set of LSBs, and the plurality of potential combinations of the set of d-MSBs, respectively.

2. The video processing method of claim 1, wherein the coding matching technique is the template matching technique, wherein determining the plurality of matching costs comprises:

determining a template for the video block from the video frame; and for each parameter candidate from the plurality of parameter candidates, determining a reference region associated with the parameter candidate, and determining a matching cost for the parameter candidate based on the reference region and the template.

3. The video processing method of claim 2, wherein for each parameter candidate comprising a corresponding MVD candidate, determining the reference region associated with the parameter candidate comprises:

generating a motion vector candidate for the video block based on the corresponding MVD candidate and a motion vector predictor indicated by an advanced motion vector prediction (AMVP) index; and determining the reference region based on the template, a reference index of a reference frame for the video block, and the motion vector candidate for the video block.

4. The video processing method of claim 2, wherein:

the one or more motion related parameters further comprise a reference index used to identify a reference frame for the video block; and determining the plurality of parameter candidates for the one or more motion related parameters further comprises determining a plurality of reference index candidates for the video block, with each parameter candidate further comprising a corresponding reference index candidate for the video block.

5. The video processing method of claim 1, wherein the coding matching technique is a bilateral matching technique, wherein determining the plurality of matching costs comprises:

for each parameter candidate from the plurality of parameter candidates, deriving one or more reference blocks associated with the parameter candidate; and determining a matching cost for the parameter candidate based on the one or more reference blocks.

6. The video processing method of claim 5, wherein:

the one or more MVDs comprise a first motion vector difference (MVD) for a first motion vector associated with a first reference frame list, or a pair of the first MVD and a second MVD for a second motion vector associated with a second reference frame list; and determining the plurality of MVD candidates comprises:

determining a plurality of first MVD candidates for the first MVD; or determining a plurality of pairs of the first MVD candidates for the first MVD and second MVD candidates for the second MVD.

7. The video processing method of claim 6, wherein for each parameter candidate which comprises a corresponding first MVD candidate or a corresponding pair of the first MVD candidates and the second MVD candidates, deriving the one or more reference blocks associated with the parameter candidate comprises:

deriving a first reference block based on the corresponding first MVD candidate, and deriving a second reference block based on a second MVD and a reference index of a second reference frame; or deriving the first reference block and the second reference block based on the corresponding pair of the first MVD candidates and the second MVD candidates.

8. The video processing method of claim 6, wherein determining the plurality of first MVD candidates comprises:

determining a plurality of absolute value candidates for the first MVD.

9. The video processing method of claim 6, wherein determining the plurality of pairs of the first MVD candidates and the second MVD candidates comprises:

determining a plurality of pairs of absolute value candidates of the first MVD and the second MVD.

10. The video processing method of claim 5, wherein:

the one or more motion related parameters further comprise a first reference index used to identify a first reference frame in a first reference frame list, or both the first reference index and a second reference index used to identify a second reference frame in a second reference frame list; and determining the plurality of parameter candidates for the one or more motion related parameters further comprises:

determining a plurality of reference index candidates for the first reference index; or determining a plurality of pairs of reference index candidates for the first reference index and the second reference index.

11. A video decoder apparatus for motion information derivation, comprising:

a non-transitory computer readable medium; and a processor configured to:

determine that one or more motion related parameters for a video block in a video frame are not signaled in a bitstream; and determine the one or more motion related parameters that comprise one or more motion vector differences (MVDs) for the video block by applying a coding matching technique, wherein the coding matching technique is a template matching technique or a bilateral matching technique, wherein the processor is configured to:

determine a plurality of parameter candidates for the one or more motion related parameters, each parameter candidate comprising one or more values for the one or more motion related parameters, respectively;

determine a plurality of matching costs associated with the plurality of parameter candidates, respectively; and derive the one or more motion related parameters based on a parameter candidate associated with a minimum matching cost among the plurality of matching costs, and wherein to determine the plurality of parameter candidates for the one or more motion related parameters, the processor is configured to determine a plurality of MVD candidates by:

determining a plurality of potential combinations for a set of derived most significant bins (d-MSBs) from a bit plane of an absolute value of a MVD of the one or more MVDs based on a length of the set of d-MSBs, wherein the absolute value of the MVD is binarized into the bit plane which comprises a set of most significant bins (MSBs), the set of d-MSBs, and a set of least significant bins (LSBs); and determining a plurality of absolute value candidates for the MVD based on the set of MSBs, the set of LSBs, and the plurality of potential combinations of the set of d-MSBs, respectively.

12. A video processing method for encoding motion information, comprising:

receiving, by a video encoder, a video block in a video frame;

determining, by the video encoder, not to signal one or more motion related parameters for the video block in a bitstream to a video decoder; and generating, by the video encoder, at least one syntax element to indicate that the one or more motion related parameters for the video block are to be predicted by the video decoder; and signaling, by the video encoder, the at least one syntax element in the bitstream for the video decoder to independently determine the one or more motion related parameters that comprise one or more motion vector differences (MVDs) for the video block, wherein generating the at least one syntax element comprises:

for each of the one or more MVDs, encoding the MVD using a binarization and splitting method; and generating a set of syntax elements based on the encoding of the MVD, wherein for each of the one or more MVDs, encoding the MVD using the binarization and splitting method comprises:

binarizing an absolute value of the MVD into a bit plane;

dividing the bit plane into a set of most significant bins (MSBs), a set of derived most significant bins (d-MSBs), and a set of least significant bins (LSBs); and generating a reduced absolute value for the MVD using the set of MSBs and the set of LSBs, and wherein, for each of the one or more MVDs, generating the set of syntax elements based on the encoding of the MVD comprises:

generating a first syntax element for indicating whether MVD prediction is to be applied on the video decoder;

generating a second syntax element for signaling the reduced absolute value of the MVD to the video decoder;

generating a third syntax element for signaling a length of the set of d-MSBs to the video decoder; and generating a fourth syntax element for signaling a position where the set of d-MSBs starts in the bit plane to the video decoder.

13. A method of storing a bitstream, comprising:

performing the video processing method according to claim 12 to generate the bitstream; and storing the generated bitstream.

14. The video processing method of claim 12, wherein the one or more motion related parameters further comprise one or more reference indices for the video block.

15. The video processing method of claim 14, wherein generating the at least one syntax element further comprises:

generating a syntax element for indicating whether reference index derivation is to be applied on the video decoder.

16. The video processing method of claim 12, wherein the video block is coded using a uni-prediction scheme or a bi-prediction scheme by the video encoder.

17. The method of claim 13, wherein the one or more motion related parameters further comprise one or more reference indices for the video block.

18. The method of claim 17, wherein generating the at least one syntax element further comprises:

generating a syntax element for indicating whether reference index derivation is to be applied on the video decoder.

19. The method of claim 13, wherein the video block is coded using a uni-prediction scheme or a bi-prediction scheme by the video encoder.

* * * * *